(12) United States Patent
Kumar et al.

(10) Patent No.: US 12,437,590 B2
(45) Date of Patent: Oct. 7, 2025

(54) MATERIALS HANDLING VEHICLE TECHNOLOGY MONITOR

(71) Applicant: Crown Equipment Corporation, New Bremen, OH (US)

(72) Inventors: Avishek Kumar, Auckland (NZ); Christian Molnar, Schwindegg (DE); James F. Schloemer, New Bremen, OH (US); James C. Meyer, New Knoxville, OH (US); Josua Logito, Auckland (NZ)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/770,858

(22) Filed: Jul. 12, 2024

(65) Prior Publication Data
US 2024/0371217 A1    Nov. 7, 2024

Related U.S. Application Data

(62) Division of application No. 17/303,464, filed on May 28, 2021, now Pat. No. 12,046,090.
(Continued)

(51) Int. Cl.
*G07C 5/12* (2006.01)
*B66F 9/075* (2006.01)
(Continued)

(52) U.S. Cl.
CPC ............ *G07C 5/12* (2013.01); *B66F 9/07581* (2013.01); *G05D 1/223* (2024.01); *G05D 1/644* (2024.01);
(Continued)

(58) Field of Classification Search
CPC ........ G07C 5/12; G07C 5/008; G07C 5/0808; G07C 5/0825; B66F 9/07581;
(Continued)

(56) References Cited

U.S. PATENT DOCUMENTS

| 12,046,090 B2 | 7/2024 | Kumar et al. |
| 2010/0228428 A1 | 9/2010 | Harshbarger et al. |

(Continued)

FOREIGN PATENT DOCUMENTS

| CN | 101799943 A | 8/2010 |
| CN | 105579823 A | 5/2016 |
| CN | 109956424 A | 7/2019 |

OTHER PUBLICATIONS

International Search Report and Written Opinion of the International Searching Authority dated Oct. 7, 2021; International Application No. PCT/US2021/034970; European Patent Office; Rijswijk, Netherlands.

(Continued)

*Primary Examiner* — Anne Marie Antonucci
*Assistant Examiner* — Patrick Daniel Mohl
(74) *Attorney, Agent, or Firm* — Stevens & Showalter LLP

(57) ABSTRACT

A process for implementing a materials handling vehicle feature monitor includes receiving wirelessly, from a fleet of materials handling vehicles, electronic vehicle records. Each electronic vehicle record comprises travel-related data recorded by an associated materials handling vehicle and an operator identification of the corresponding operator of the vehicle. The vehicle records are parsed for each operator to extract dashboard data, which can include a travel distance that the materials handling vehicle has traveled. An expected travel distance under remote control to total travel distance for the predetermined period of time is established. For each
(Continued)

operator, an electronic measurement of the expected travel distance under remote control to total travel distance for the predetermined period of time compared to the recorded travel distance under remote control to total travel distance for the predetermined period of time is generated. A graphical representation of the generated measurements is outputted to a dashboard.

13 Claims, 14 Drawing Sheets

Related U.S. Application Data

(60) Provisional application No. 63/032,621, filed on May 30, 2020.

(51) Int. Cl.
| | |
|---|---|
| *G05D 1/223* | (2024.01) |
| *G05D 1/644* | (2024.01) |
| *G05D 1/692* | (2024.01) |
| *G06Q 10/0639* | (2023.01) |
| *G07C 5/00* | (2006.01) |
| *G07C 5/08* | (2006.01) |

(52) U.S. Cl.
CPC ....... *G05D 1/692* (2024.01); *G06Q 10/06398* (2013.01); *G07C 5/008* (2013.01); *G07C 5/0808* (2013.01); *G07C 5/0825* (2013.01)

(58) Field of Classification Search
CPC ........ G05D 1/223; G05D 1/644; G05D 1/692; G06Q 10/06398; G06Q 10/08
See application file for complete search history.

(56) References Cited

U.S. PATENT DOCUMENTS

| | | |
|---|---|---|
| 2016/0368508 A1 | 12/2016 | Manci et al. |
| 2017/0146975 A1 | 5/2017 | Clark |
| 2017/0372184 A1 | 12/2017 | Manci et al. |
| 2018/0151088 A1 | 5/2018 | Tan et al. |
| 2020/0019160 A1 | 1/2020 | McArthur et al. |
| 2021/0241545 A1* | 8/2021 | Hayashida ........... G07C 5/0841 |
| 2022/0005291 A1 | 1/2022 | Konrardy et al. |

OTHER PUBLICATIONS

International Preliminary Report on Patentability dated Dec. 6, 2022; International Application No. PCT/US2021/034970; The International Bureau of WIPO; Geneva, Switzerland.

Mohl, Patrick Daniel; Restriction Requirement dated Jan. 25, 2023; U.S. Appl. No. 17/303,464; United States Patent and Trademark Office; Alexandria, Virginia.

Mohl, Patrick Daniel; Non-Final Office Action dated Jun. 7, 2023; U.S. Appl. No. 17/303,464; United States Patent and Trademark Office; Alexandria, Virginia.

Mohl, Patrick Daniel; Final Office Action dated Dec. 5, 2023; U.S. Appl. No. 17/303,464; United States Patent and Trademark Office; Alexandria, Virginia.

Mohl, Patrick Daniel; Notice of Allowance and Fees Due dated Mar. 18, 2024; U.S. Appl. No. 17/303,464; United States Patent and Trademark Office; Alexandria, Virginia.

Wang, Jinping; Notification of the First Office Action dated May 20, 2025; Chinese Application No. 202180034959.5; China National Intellectual Property Administration; Beijing, China.

Dal-Kyung, Lee; Notice of Submission of Opinion dated Jul. 31, 2025; Korean Application No. 10-2022-7044669; Korean Intellectual Property Office; Daejeon, South Korea.

* cited by examiner

MATERIALS HANDLING VEHICLE TECHNOLOGY MONITOR

CROSS REFERENCE TO RELATED APPLICATIONS

This application is a divisional application of U.S. patent application Ser. No. 17/303,464, filed May 28, 2021, entitled "MATERIALS HANDLING VEHICLE TECHNOLOGY MONITOR", which claims the benefit of U.S. Provisional Patent Application Ser. No. 63/032,621, filed May 30, 2020, entitled "MATERIALS HANDLING VEHICLE AUTOMATION MONITOR", the entire disclosures of which are hereby incorporated by reference.

FIELD

Various aspects of the present disclosure relate generally to the use of technology features on materials handling vehicles, and more particularly to the monitoring, management, control, modification, and combinations thereof, of materials handling vehicles, technology features on materials handling vehicles, and working environments that support such technology features.

BACKGROUND

Materials handling vehicles are commonly used for picking stock in warehouses and distribution centers. Such vehicles typically include a power unit and a load handling assembly, which may include load carrying forks. The vehicle also has control structures for controlling operation and movement of the vehicle. Moreover, wireless strategies are deployed by various enterprises to improve the efficiency and accuracy of operations.

For instance, in a typical warehouse implementation, a forklift truck is equipped with a communications device that links a corresponding forklift truck operator to a management system executing on an associated computer enterprise via a wireless transceiver. Essentially, the communications device is used as an interface to the management system to direct the tasks of the forklift truck operator, e.g., by instructing the forklift truck operator where and/or how to pick, pack, put away, move, stage, process or otherwise manipulate items within a facility.

BRIEF SUMMARY

According to aspects of the present disclosure, a process for implementing a materials handling vehicle technology monitor is provided. The method comprises receiving wirelessly, from a fleet of materials handling vehicles, electronic vehicle records. Each electronic vehicle record comprises technology feature data recorded by a controller on an associated materials handling vehicle. Typically, the electronic vehicle record is generated in response to a corresponding technology feature on the materials handling vehicle being operated in a work environment, but other triggers can cause an electronic vehicle record to be generated. Moreover, each electronic vehicle record can include an operator identification of an operator of the materials handling vehicle at the time the technology feature data is recorded. The process also comprises generating for each operator, an electronic measurement based upon a comparison of an expected technology feature usage, e.g., a threshold, compared to the technology feature data in the received electronic vehicle records, which are associated with the corresponding operator. The process further comprises outputting to a dashboard, a graphical representation of the generated measurements.

According to still further aspects of the present disclosure, a process for implementing a materials handling vehicle technology monitor is provided. The process comprises receiving wirelessly, from a fleet of materials handling vehicles, electronic vehicle records. Each electronic vehicle record comprises technology feature data recorded by a controller on an associated materials handling vehicle, e.g., in response to a corresponding technology feature on the materials handling vehicle being operated. Each electronic record can include an operator identification of the operator of the materials handling vehicle at the time the technology feature data is recorded. The process further comprises generating for each operator, an electronic measurement based upon a comparison of expected technology feature usage data compared to the electronic vehicle records associated with the operator. Also, the process comprises outputting to a dashboard, a graphical representation of the generated measurements. In some embodiments, the process also comprises analyzing the generated measurements to determine whether there is a detectable equipment issue based upon rules extracted from a rules engine, that is adversely affecting the comparison for at least one operator. Still further, the process comprises automatically generating an electronic signal that addresses the detected equipment issue.

According to aspects of the present disclosure, a process for implementing a materials handling vehicle feature monitor is provided. The process comprises receiving wirelessly, from a fleet of materials handling vehicles, electronic vehicle records. In this regard, each electronic vehicle record comprises travel-related data recorded by a controller on an associated materials handling vehicle environment, and an operator identification of the corresponding operator of the materials handling vehicle. The process also comprises parsing the vehicle records for each vehicle operator to extract dashboard data. Here, the dashboard data can include a travel distance that the materials handling vehicle has traveled, e.g., responsive to the corresponding operator using a remote-controlled travel function over a predetermined time period, a total travel distance that the materials handling vehicle has traveled over the predetermined time period, etc. The process still further comprises establishing an expected travel distance under remote control to total travel distance for the predetermined period of time. Yet further, the process comprises generating for each operator, an electronic measurement of the expected travel distance under remote control to total travel distance for the predetermined period of time compared to the recorded travel distance under remote control to total travel distance for the predetermined period of time, and outputting to a dashboard, a graphical representation of the generated measurements.

According to yet further aspects of the present disclosure, a materials handling vehicle is provided, which is suitable for use with a materials handling vehicle feature monitor. The materials handling vehicle comprises a power unit having a traction motor controller coupled to a traction motor that drives at least one steered wheel of the materials handling vehicle. The materials handling vehicle also comprises a technology feature, e.g., a remote-control receiver that pairs with a wireless remote-control device. The materials handling vehicle also comprises a transceiver that wirelessly communicates with a remote server computer.

Still further, the materials handling vehicle comprises a controller on the industrial vehicle that is coupled to memory.

In an example embodiment, the controller runs program code stored in the memory to receive a command from the remote-control receiver to implement a function responsive to the remote-control receiver communicating with the paired remote-control device, and communicate a command to a traction motor controller to cause the materials handling vehicle to automatically advance responsive to the command to implement the remote-controlled travel function. The controller further runs program code to generate a vehicle record comprised of materials handling vehicle travel-related data associated with the remote-controlled travel function and transmit the generated vehicle record, by the information linking device, to the remote server to log use of the remote-controlled travel function.

In some embodiments, responsive to monitoring the feature usage, feedback and control is carried out to modify a corresponding materials handling vehicle. The modification can be initiated by a remote server or by a processor on the materials handling vehicle itself. As a non-limiting example, a remote server can analyze an electronic measurement of an expected travel distance under remote control to total travel distance for a predetermined period of time compared to a recorded travel distance under remote control to total travel distance for the predetermined period of time, and responsive thereto, initiate a modification to the materials handling vehicle, e.g., by adjusting an operating parameter of the technology feature, or of the materials handling vehicle itself. As another non-limiting but illustrative example, a processor on the materials handling vehicle can monitor usage of a feature (e.g., remote controlled travel function feature). By querying task information, the processor can, for example, deny a remote start/remote travel command if a next pick operation is too far away from a current position of the materials handling vehicle. Analogously, the processor can deny a remote start/remote travel command where a next pick is too close to a current position of the materials handling vehicle. Other examples are provided, as set out in greater detail herein.

Figure 1:
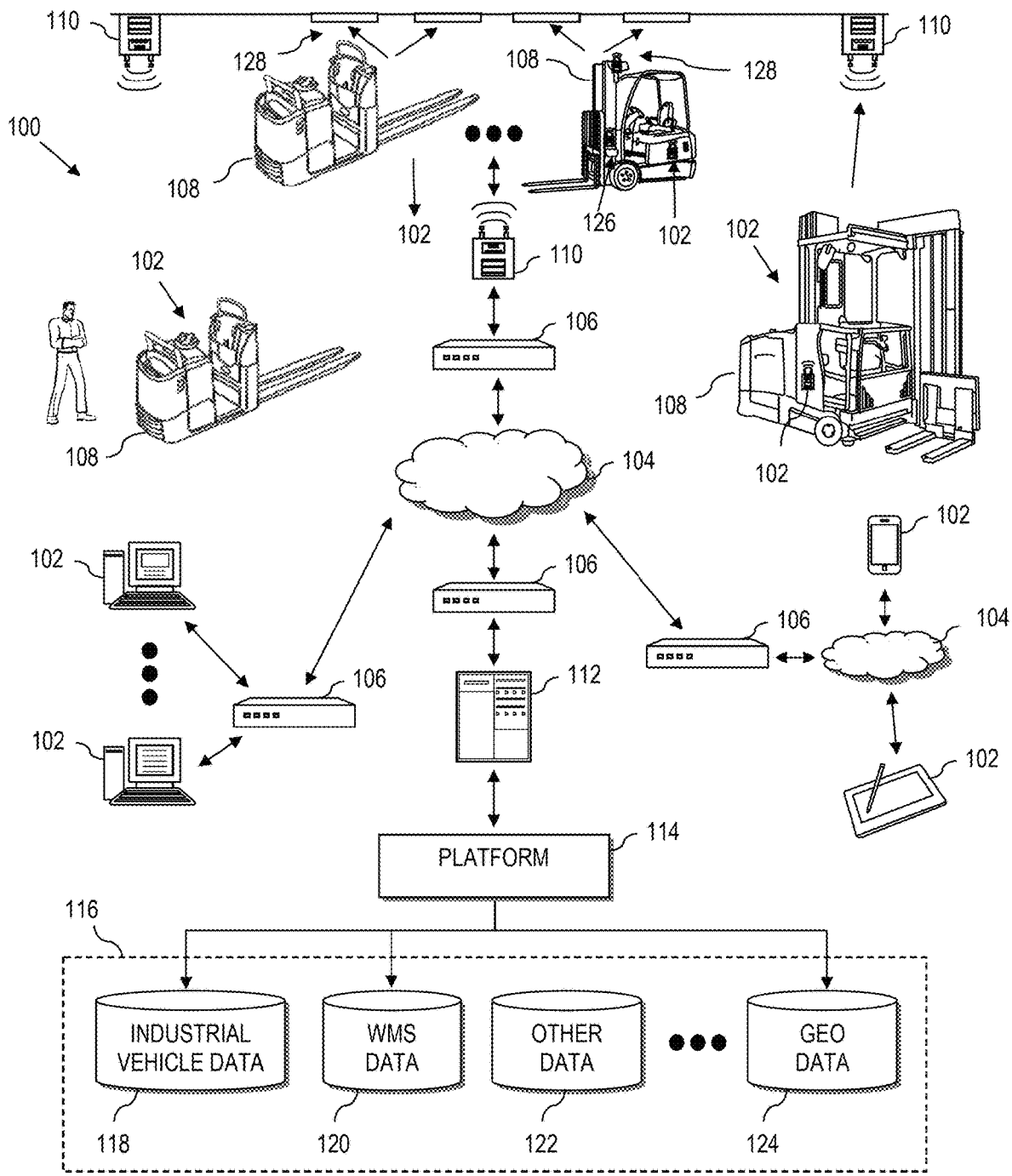
FIG. 1 is a schematic view of an operating environment for materials handling vehicles.

In the following detailed description of the illustrated embodiments, reference is made to the accompanying drawings that form a part hereof, and in which is shown by way of illustration, and not by way of limitation, specific embodiments in which the disclosure may be practiced. It is to be understood that other embodiments may be utilized and that changes may be made without departing from the spirit and scope of various embodiments of the present disclosure.

DETAILED DESCRIPTION

A materials handling vehicle can be equipped with one or more "technology features". As used herein, a technology feature is any one or more of: a vehicle capability that an operator has the choice of using or not using; a vehicle capability that an operator has the choice of when to use (e.g., if used at all), e.g., in the course of performing a task; a vehicle capability where an operator has a choice in the manner in which the vehicle capability affects operation of the materials handling vehicle (e.g., when used); a vehicle capability that an operator must actively enable, actuate, operate, etc., to engage, enable, or otherwise use, or combination thereof.

In this regard, proper usage of such a technology feature can bring about one or more benefits, which may include increased vehicle battery life (including increased time between need for charges), reduce wear on the materials handling vehicle, increase the time between the need for service or maintenance, reduce operator fatigue, combinations thereof, etc. Likewise, it is possible that improper use of such a technology feature can bring about one or more negative outcomes, which may include decreased battery life (e.g., shortened time between need for charges), decreased time between service or maintenance, increased operator fatigue, combinations thereof, etc.

Introduction: Assistive Technology Feature

By way of an illustrative example, an industrial vehicle can be equipped with a technology feature such as an assistance system that provides autonomous operation, semiautonomous operation, remote-controlled operation, or a combination thereof. However, the assistance system must be used properly in order to be effective.

Briefly, an example comprises a remote-controlled travel function. To use the remote-controlled travel function, an operator presses a button on a wireless transmitter, which causes an associated materials handling vehicle to travel forward based upon a predetermined criteria, without the assistance or need for an operator to be physically on and operating the materials handling vehicle. This allows an operator to walk alongside or behind the materials handling vehicle in order to prepare for a next task. Since this is a remote-control operation, the operator has the option to use (or not use) the remote-controlled travel function.

Introduction: Auto-Positioning Technology Feature

By way of another illustrative example, a materials handling vehicle may be equipped with a technology feature such as an auto-positioning system (APS). The auto-positioning system automatically plans, then controls a materials handling vehicle to automatically follow a predefined route from a current position to a next position, following a calculated most efficient path that blends lift and travel functions to optimize the time and/or energy efficiency required to reach and automatically stop at a next rack location. In this regard, the auto-positioning system can account for features such as travel distance, travel path, and lift height to optimize the path.

However, an operator typically has the option to use APS or to not use APS. Moreover, in some embodiments, the operator may be able to exercise control over when to engage the APS relative to the destination location. For instance, an operator may initiate auto-positioning to travel to a next location by manually programming the next position, or the materials handling vehicle may automatically obtain the next location, e.g., by interacting with a warehouse management system on a remote server.

Introduction: End of Aisle Control Technology Feature

By way of a yet another illustrative example, a materials handling vehicle may be equipped with a technology feature such as an End Aisle Control (EAC). End aisle control is implemented to automate how a materials handling vehicle responds when approaching an end of an aisle, when approaching an intersection, or other region of operation designated by the EAC. Briefly, when a vehicle enters a boundary defined by or otherwise recognized by the EAC, a processor on the vehicle takes control of the vehicle's motive controls (e.g., traction control module, brake module, etc.), to bring about control of the materials handling vehicle, e.g., to stop or slow down within the designated boundary.

For instance, in some embodiments, EAC may bring a materials handling vehicle to a stop when the vehicle reaches a designated position, such as the end of an aisle. In other embodiments, EAC may slow down the materials handling vehicle, e.g., such as when traveling across an intersection. For instance, the EAC may slow down a materials handling vehicle to a selectable speed. In still other embodiments, EAC may be a selectable feature, e.g., to slow or stop the materials handling vehicle in response to approaching an EAC boundary. Also, the EAC may be activated by an operator-initiated control or action, thus, a materials handling vehicle response to an EAC boundary may be dynamic, e.g., depending upon when the EAC was activated.

Introduction: Auto Fence Technology Feature

Still another example technology feature is an auto fence technology feature. The auto fence (AF) capability, when engaged, utilizes geo-features, e.g., using RFID tags, ultra-wideband badges, environmental based location tracking, virtual markers e.g., mapped to physical locations within a facility, combinations thereof, etc., to define control regions. Auto fencing enables numerous uses, such as to set up speed or height zones, automatically slow vehicle travel speed, stop or limit lift height based on the location of the vehicle in a designated zone, etc. In some embodiments, AF may be activated by an operator-initiated control or action, thus, a materials handling vehicle response to an AF geo-feature may be dynamic.

Introduction: Rack Height Select Technology Feature

Still another example of a technology feature is a rack height select (RHS) feature, which allows various fork height settings to be pre-programmed such that, upon operation of a control, the forks of the materials handling vehicle raise to a pre-programmed height. Briefly, an operator can repeatedly raise a vehicle's forks to a known height (e.g., corresponding to various rack heights) by selecting a corresponding preset in a rack height select interface. Yet again, the operator has the choice on whether to use rack height select.

Introduction: Multi-task Control Handle Technology Feature

Still another example technology feature is a multi-task control handle, e.g., which blends hydraulic control functions and traction control functions. By way of example, an operator can "blend" traction and lift, e.g., begin to raise the forks on a materials handling vehicle as the vehicle approaches a destination bin so that the forks are at or near the correct height by the time the vehicle arrives at the destination. This is an example of a technology feature where an operator has a choice of "when" to use the technology feature (if at all), because operator interaction with the multi-task handle controls when the "blend" begins, and operator interaction with the multi-task control handle controls the ratio of lift to traction (speed at which the load is raised or lowered to the speed at which the vehicle approaches the destination).

Introduction: Travel Speed Technology Feature

Yet another example of a technology feature is a "turtle/rabbit" travel speed switch that allows a materials handling vehicle to have a travel setting for easier operator control for maneuvering (turtle), and a travel setting for situations that require relatively less maneuvering within a given travel path (rabbit), with increased top travel speed compared to the turtle setting. The travel speed switch is an example where an operator has a choice in the manner in which the vehicle capability affects operation of the materials handling vehicle, because the operator has control of what position the switch is in, and when to change the switch position.

Other examples of technology features can be implemented within the spirit of the present disclosure herein. For example, certain technology features can be accessed and controlled by an operator during normal use of a materials handling vehicle. Such uses may involve or otherwise affect vehicle movement, limitations on control (e.g., adjusting set points), automating or semi-automating temporary interactions (e.g., automated or semi-automated aisle passing maneuvers), etc. Such uses may alter or control vehicle load handling capabilities, e.g., lift height, load weight limits, tugger capability, etc. Such technology may also be operator-centric, e.g., by selecting and/or customizing technology feature performance, controlling informational indicators such as lights, dashboard output, display output, etc.

Notably, a given technology feature must be used properly in order to be effective. Moreover, the technology feature on each materials handling vehicle in a fleet must be adequately maintained to ensure consistent and effective operation. In this regard, traditional technology features do not provide any way to monitor usage, e.g., by individual operators or groups of operators. As such, a technology feature can go largely unused, overused, or misused, if an operator is not adequately trained in how to operate the technology feature in the context of the task at hand. Moreover, traditional technology features do not provide any way to monitor state of health, operability, proper calibration, tuning, wear, or other serviceable conditions. As such, maintenance and service of a technology feature can be neglected, rendering the technology feature non-operable.

In view of the above, disclosed herein is a materials handling vehicle feature monitor that monitors materials handling vehicle feature usage. Also disclosed herein is a materials handling vehicle technology system that monitors, manages, controls, modifies (e.g., to tune a technology feature to a specific set of conditions, optionally including dynamic conditions, such as environmental conditions, operator conditions, etc.), combinations thereof, etc., materials handling vehicle technology feature usage. In a practical application, a materials handling vehicle technology feature monitor is implemented as a control center that actively monitors one or more technology features across a fleet of vehicles. The control center monitors how technology features are being used by operators. Based upon this information, the control center provides information about operators' usage of a technology feature, the development of the operator's usage of the technology feature over time, technical issues preventing operators from using the technology feature, combinations thereof, etc.

In some embodiments, the control center also provides feedback based upon the monitored information. For instance, feedback may be to the operator (e.g., in real-time, during usage). Feedback may also be to a materials handling vehicle, e.g., to modify control of the materials handling vehicle, to modify set points, to change a performance tuning of the materials handling vehicle, etc. Yet further, feedback may be to the technology feature on the associated materials handling vehicle itself, e.g., based upon actual measured usage (or lack thereof), e.g., to effect updates, to "tune" performance of the technology feature (e.g., by modifying setpoints, operating parameters of the specific technology feature, etc.), etc., including the ability to control the technology feature to take some action, etc., as will be described in greater detail herein.

In still some other embodiments, the control center provides a feedback to monitor, program, control, modify, or otherwise affect an environment in which a technology feature is used, as will be described in greater detail herein.

According to still other embodiments herein, proper usage of technology features can bring about further improvements, including efficiency of operation, which can lead to increased productivity. Correspondingly, it is possible that improper use of such technology features can cause decreased efficiency of operation, which can lead to decreased productivity.

System Overview

Referring now to the drawings and in particular to FIG. 1, a schematic diagram illustrates a materials handling vehicle system 100 that includes a plurality of hardware-equipped processing devices 102 that are linked together by one or more network(s) 104.

The network 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise intranets, extranets, local area networks (LAN), wide area networks (WAN), wireless networks (WiFi), the Internet, including the world wide web, ad-hoc networks, localized networks, mesh networks (e.g., between two or more processing devices 102), cellular and/or other arrangements for enabling communication between the processing devices 102, etc.

A processing device 102 can be implemented as a server, personal computer, laptop computer, tablet, purpose-driven appliance, internet of things (IoT) device, special purpose computing device, cellular device including a smartphone, an information processing device on a vehicle, an information processing device on a machine (fixed or mobile), or other device capable of communicating over the network 104.

Particularly, a processing device 102 is provided on one or more materials handling vehicles 108. In the example configuration illustrated, a processing device 102 on a materials handling vehicle 108 wirelessly communicates through one or more technologies, e.g., via Wi-Fi access points 110 to a corresponding networking component 106, which serves as a connection to the network(s) 104. As another example, a materials handling vehicle 108 can be equipped with cellular or other suitable wireless technology that allows the processing device 102 on the materials handling vehicle 108 to communicate directly with a remote device (e.g., over the network(s) 104).

The system 100 also includes a processing device implemented as a server 112 (e.g., a web server, file server, and/or other processing device) that supports a platform 114 and corresponding data sources (collectively identified as data sources 116). In example embodiments, the platform 114 can be utilized to implement the control center (feature monitor), as described more fully herein. For instance, materials handling vehicles 108 are typically operated in a work environment such as a warehouse, distribution center, retail establishment, etc. As such, the platform 114 provides materials handling vehicle monitoring, management, control, or combinations thereof.

As noted more fully herein, materials handling vehicles 108 can be equipped with one or more technology features that require training and experience to use effectively. As such, the platform 114 provides technology feature monitoring, management, control, or combinations thereof, e.g., in response to technology feature usage (and optionally in response to lack or usage lack thereof).

In the illustrative example, the data sources 116, which need not be co-located, include databases that tie processes executing for the benefit of an enterprise, from multiple, different domains. In the illustrated example, data sources 116 include a materials handling vehicle information data source 118 that collects data from the operation of materials handling vehicles 108, e.g., in a materials handling vehicle domain. By way of example, the materials handling vehicle information database can store electronic vehicle records, e.g., received wirelessly, from a fleet of materials handling vehicles. In this regard, each electronic vehicle record can comprise travel-related data, operational data, maintenance data, observational data, configuration data, component state data, measured sensor data, impact data, or other information recorded by a processing device 102 on an associated materials handling vehicle 108. Each electronic vehicle record can also include an operator identification of the corresponding operator of the materials handling vehicle.

Data sources 116 can also include a management system data source 120, e.g., a warehouse management system (WMS). The WMS relates information to the movement and tracking of goods within the work environment in a WMS domain. As such, in some embodiments, WMS data (alone or in combination with data from one or more other data sources, such as the materials handling vehicle information data source 118) can be utilized to select, define, refine, etc., characteristics affecting operation of a technology feature, e.g., a threshold or threshold range characterizing remote-control travel distances for the work environment, and other examples as will be described in greater detail herein.

Moreover, data sources 116 can include any other data source(s) 122 needed by the work environment, such as a labor management system (LMS), etc. In some embodiments, the system may also include a data source such as a geo-location system 124 that stores information pertaining to geo-features in an environment, geo-capabilities and/or restrictions imposed on a materials handling vehicle, e.g., via a technology feature or otherwise. The geo-location data can also include data related to positioning within an environment, e.g., via an environmental-based location tracking system, etc. The above list is not exhaustive and is intended to be illustrative only.

Materials Handling Vehicle

Materials handling vehicles can comprise for example, a low-level order picking truck, a forklift truck, reach truck, narrow aisle truck, a stacker, a pallet truck, a tow tractor, an order picker, etc. In this regard, the materials handling vehicle may comprise forks that raise and lower. In other example embodiments, a materials handling vehicle may comprise a tugger having a hitch or other coupling structure to push and/or pull loads.

Example Low-Level Order Picking Truck

Figure 2:
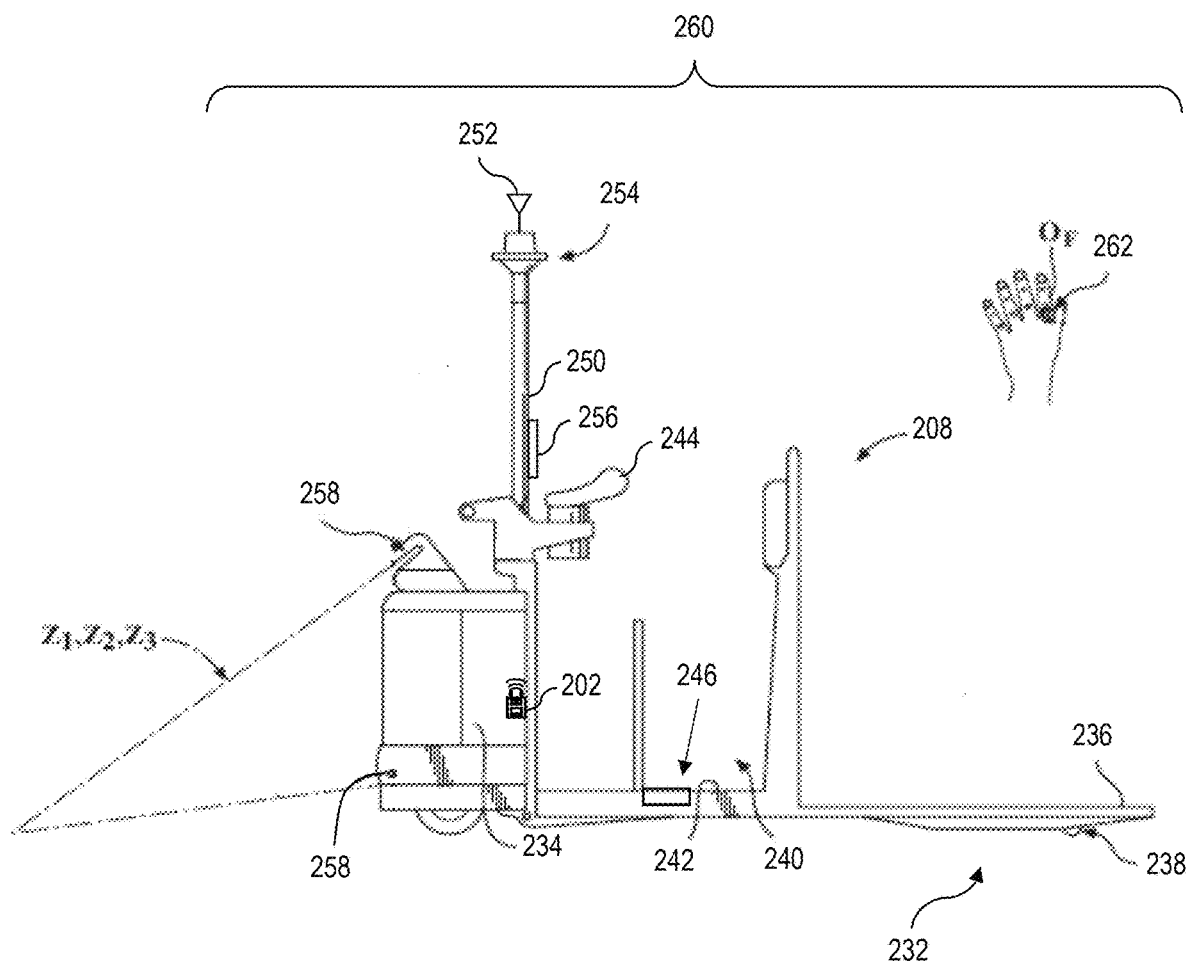
FIG. 2 is a side view of a materials handling vehicle having a technology feature that implements a remote-controlled travel function.

Referring now to FIG. 2, a materials handling vehicle 208 is illustrated as a low-level order picking truck. The materials handling vehicle 208 is one such example of a materials handling vehicle 108 (FIG. 1) and thus like elements are illustrated with like reference numbers 100 higher. In this regard, the description of the materials handling vehicle 108 (FIG. 1) is applied by analogy to the materials handling vehicle 208 (FIG. 2) and thus different or specific features with regard to the low-level order picking truck will be described in detail.

The illustrated materials handling vehicle 208 includes a load handling assembly 232 that extends from a power unit 234.

The load handling assembly 232 includes a pair of forks 236, each fork 236 having a load supporting wheel assembly 238. The load handling assembly 232 may include other load handling features in addition to, or in lieu of the illustrated arrangement of the forks 236.

The illustrated power unit 234 comprises a step-through operator's station 240 dividing a first end section of the power unit 234 (opposite the load handling assembly 232) from a second end section (proximate the load handling assembly 232). The step-through operator's station 240 includes a platform 242 upon which an operator may stand to drive the materials handling vehicle 208, e.g., using controls 244, and/or to provide a position from which the operator may operate various included features of the materials handling vehicle 208, e.g., controls 244.

In some embodiments, presence sensors 246 may be provided to detect the presence of an operator positioned within the operator's station 240. For example, presence sensors 246 may be located on, above, under, combinations thereof, etc., the platform 242, or otherwise provided about the step-through operator's station 240.

A hardware-equipped processing device 202 (analogous to that described with reference to processing device 102, FIG. 1) is positioned on the materials handling vehicle 208, e.g., within the power unit 234. In the context of deployment on the materials handling vehicle 208, the hardware equipped processing device 202 is also referred to herein as an information linking device 202, as will be described more fully herein.

In the example low level order picking truck, a pole 250 extends vertically from the power unit 234 and includes one or more antenna/antennae 252. For instance, one or more antenna/antennae 252 can be provided for receiving control signals from a corresponding wireless remote-control device. One or more antenna/antennae 252 can also be utilized to connect the information linking device 202 and/or the materials handling vehicle 208 to a remote computer device, e.g., the server 112 (FIG. 1). The antenna/antennae 252 are illustrated schematically, and can in practice, be integrated into the pole 250. In other example embodiments, the antenna/antennae 252 can be positioned anywhere practical on the materials handling vehicle 208.

A light 254 may be positioned on the pole 250, e.g., at the top of the pole 250. The light 254 can be used as part of a situational awareness system to provide feedback to the vehicle operator and/or pedestrians in the vicinity of the materials handling vehicle 208.

Also, a display 256 may be mounted to the pole 250 or to another suitable location at or near the power unit 234. The display 256 provides a graphical user interface that enables an operator to interact with functions of the materials handling vehicle 208, interact with programming and data exchanges with the remote server 112 (FIG. 1) via the information linking device 202, combinations thereof, etc.

The materials handling vehicle 208 also comprises one or more contactless obstacle sensors 258. The obstacle sensors 258 are operable to define one or more detection zones, e.g., three detection zones Z1, Z2, and Z3 as illustrated. For example, at least one detection zone may define an area at least partially in front of a forward traveling direction of the materials handling vehicle 208 when the materials handling vehicle 208 is traveling in response to a wirelessly received travel request, described more fully herein.

The obstacle sensors 258 may comprise any suitable proximity detection technology, such as ultrasonic sensors, image capture devices, infrared sensors, laser scanner sensors, etc., which are capable of detecting the presence of objects/obstacles or are capable of generating signals that can be analyzed to detect the presence of objects/obstacles within the predefined detection zone(s).

Remote Control Feature

According to aspects of the present disclosure, a system 260 includes the materials handling vehicle 208, a remote-control device 262, and optionally, the remote server 112 (FIG. 1), e.g., via wireless communication via the information linking device 202. The system enables a technology feature such as remote-controlled travel.

The remote-control device 262 is manually operable by an operator, e.g., by pressing a button or other control, to cause the remote-control device 262 to wirelessly transmit a signal designating a travel request to the materials handling vehicle 208.

In some embodiments, before the materials handling vehicle 208 accepts the travel request, the remote-control device 262 may be required to pair to a corresponding controller on the materials handling vehicle 208, e.g., using Bluetooth, ultra-wide band, or other wireless communication technology.

Although the remote-control device 262 is illustrated in FIG. 2 as a finger-wearable structure, numerous implementations of the remote-control device 262 may be implemented, including for example, a glove structure, a lanyard or sash mounted structure, etc. Using a pairing system/ protocol ensures that the materials handling vehicle will respond to travel messages only from the paired wireless remote-control device. In some embodiments, pairing is carried out using a PIN code or other authentication, including authentication using near-field communication (NFC), physical electrical contacts, etc.

In this regard, the materials handling vehicle 208 communicates with the remote server 112 (FIG. 1) over a first wireless connection (e.g., via the information linking device 202 using Wi-Fi), and communicates with the remote-control device 262 over a second wireless connection (e.g., Bluetooth, ultra-wide band, etc.), which is different from the first wireless connection.

Information Linking Device Integrated With Materials Handling Vehicle

Figure 3:
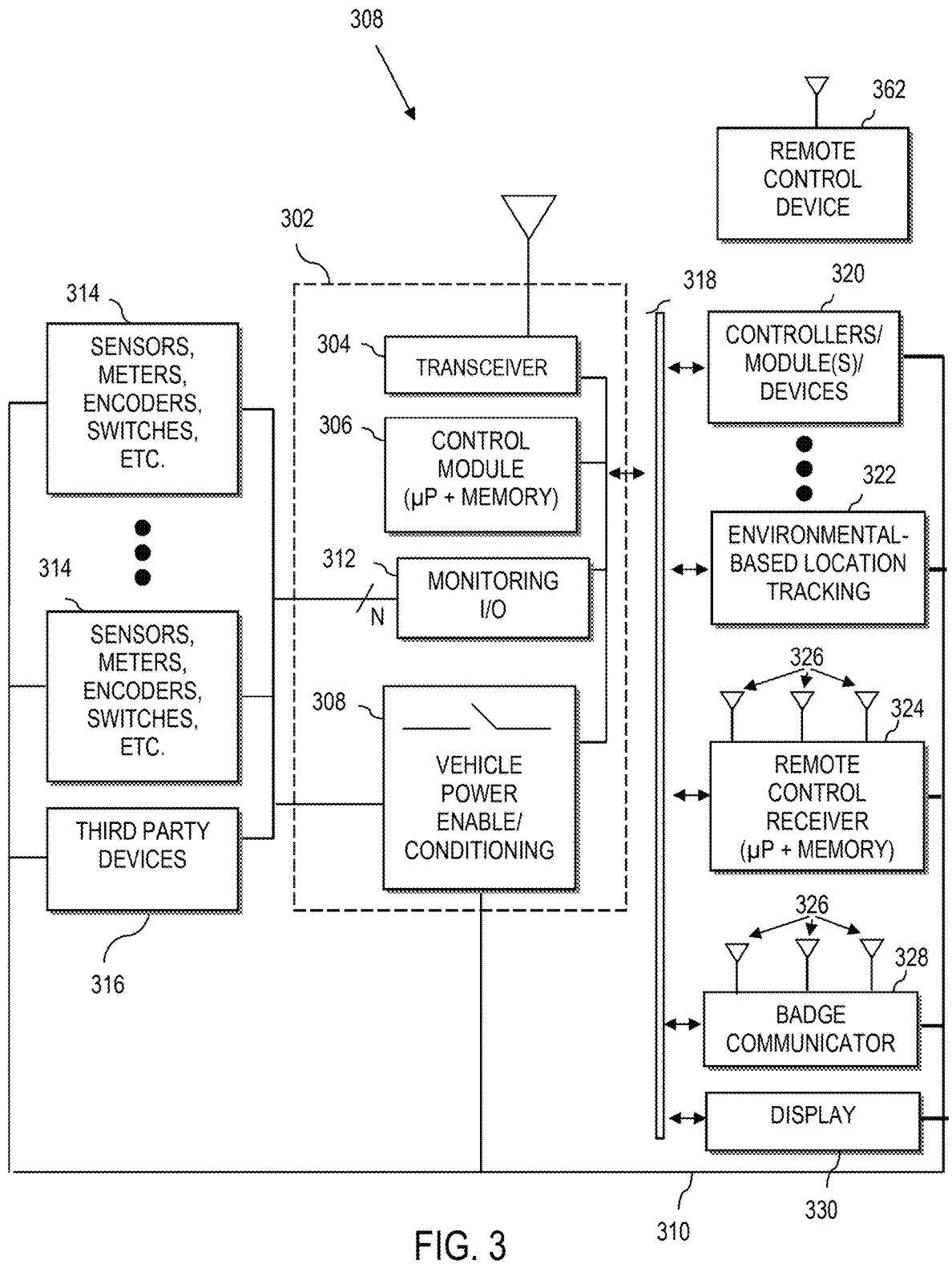
FIG. 3 is a schematic diagram of several electrical components of a materials handling vehicle that support one or more technology features.

Referring to FIG. 3, a block diagram illustrates an electronic control arrangement for a materials handling vehicle 308, e.g., any of the materials handling vehicles 108 of FIG. 1, and/or materials handling vehicle 208 (FIG. 2). The materials handling vehicle 308 has a processing device 302 that is implemented as a special purpose, particular computer, (further designated herein as an information linking device 302) that mounts to or is otherwise integrated with the materials handling vehicle 308. In practical applications, the processing device 302 is an example implementation of the processing device 102 (FIG. 1) and/or the processing device 202 (FIG. 2).

The information linking device 302 comprises the necessary circuitry to implement wireless communication, data and information processing, and wired (and optionally wireless) communication to components of the materials handling vehicle 308, and with the server 112 (FIG. 1), e.g., via access points 110 (FIG. 1), cellular, other wireless technology, etc.

The illustrated information linking device 302 includes a transceiver 304 for wireless communication. Although a single transceiver 304 is illustrated for convenience, in practice, one or more wireless communication technologies may be provided. For instance, the transceiver 304 can communicate with a remote server, e.g., server 112 of FIG. 1, via 802.11.xx across the access points 110 of FIG. 1, support other wireless communication (e.g., cellular, Bluetooth, infrared (IR), ultra-wide band (UWB), or any other technology), or combinations thereof. Also, the transceiver 304 may be implemented as a separate component on the materials handling vehicle, which communicates with the information linking device 302 across a suitable connection, e.g., a bus connection.

The information linking device 302 also comprises a control module 306, having a processor coupled to memory for implementing computer instructions, including computer-implemented processes, or aspects thereof, as set out and described more fully herein. For instance, the control module 306 utilizes the transceiver 304 to exchange information with a remote server 112 (FIG. 1) for controlling operation of the materials handling vehicle 308.

In some embodiments, the information linking device 302 further includes power enabling circuitry 308 controlled by the control module 306 to selectively enable or disable the materials handling vehicle 308 (or alternatively, to selectively enable or disable specific control modules or vehicle functions such as hydraulic, traction, etc.). For instance, the control module 306 can control the power enabling circuitry 308 to provide power to the materials handling vehicle 308, to provide power to select components of the materials handling vehicle 308, to provide power for select vehicle functions, etc., via power line 310, e.g., based upon operator login, detected geo-features, etc.

In some embodiments, the information linking device 302 includes a monitoring input output (I/O) module 312 to communicate via wired or wireless connection to peripheral devices attached to or otherwise mounted on the materials handling vehicle 308, such as sensors, meters, encoders, switches, lights, etc. (collectively represented by reference numeral 314). The module 312 may also be connected to other devices, e.g., third party devices 316 such as RFID scanners, displays, meters, etc. This allows the control module 306 to obtain and process information monitored, collected, or otherwise sensed on the materials handling vehicle 308.

The information linking device 302 is coupled to and/or communicates with other industrial vehicle system components via a suitable vehicle network 318. The vehicle network 318 is any wired or wireless network, bus or other communications capability that allows electronic components of the materials handling vehicle 308 to communicate with each other. As an example, the vehicle network 318 may comprise a controller area network (CAN) bus, Local Interconnect Network (LIN), time-triggered data-bus protocol (TTP), RS422 bus, or other suitable communication technology.

In the example configuration, the control module 306 of the information linking device 302 connects with, understands and is capable of communication with native vehicle electronic components, such as traction controllers, hydraulic controllers, modules, devices, bus enabled sensors, displays, lights, light bars, sound generating devices, input/output devices, etc. (collectively referred to by reference 320).

In some embodiments, the materials handling vehicle 308 can also include features/capabilities that support one or more technology features, such as an optional environmental-based location tracking system 322, an optional remote control receiver 324, an optional badge communicator 328, an optional display 330, or combinations thereof.

The optional environmental-based location tracking device 322 enables the materials handling vehicle 308 to be spatially aware of its location within a dimensionally constrained environment, e.g., a mapped portion of an industrial enterprise. As such, the environmental-based location tracking device 322 can assist technology features such as AF, APS, and other technology features that use or can be augmented by position information. Here, the environmental-based location tracking device 322 can comprise a local awareness system that utilizes markers, including fiducial markers, RFID, beacons, lights, reflectors, ultrawide-band badges, other external devices, combinations thereof, etc., to allow spatial awareness within the industrial (e.g., warehouse, manufacturing plant, etc.) environment. Moreover, local awareness can be implemented by machine vision guidance systems, e.g., using one or more cameras, inertial sensors, vehicle sensors, encoders, accelerometers, gyroscopes, etc.

If the materials handling vehicle 308 implements a technology feature such as a remote-controlled travel function, then the materials handling vehicle 308 can optionally include a remote-control receiver 324. In alternative embodiments, the remote-control receiver 324 can be integrated with or otherwise incorporated with the information linking device 302. Likewise, in some embodiments, the information linking device 302 can be integrated into the remote-control receiver 324.

The remote-control receiver 324 includes a transceiver for short range communication with a suitably configured remote-control device 362 (e.g., analogous to the remote-control device 262, FIG. 2). In certain illustrative implementations, the remote-control device 362 is worn or otherwise carried by an operator, and can communicate with the remote-control receiver 324, e.g., by way of non-limiting example, when in a range of about 20-35 meters or less. The remote-control receiver 324 can communicate using any proprietary or standardized communication protocol including Bluetooth (over IEEE 802.15.1), ultra-wideband (UWB, over IEEE 802.15.3), ZigBee (over IEEE 802.15.4), Wi-Fi (over IEEE 802.11), WiMax (over IEEE 802.16), etc.

In certain illustrative implementations, the remote-control receiver 324 includes at least two or three antennae 326. The availability of multiple antennae allows not only signal detection, but also positioning within the detection region. Regardless, the remote-control receiver 324 can compute position (or distance) via time of flight calculations, phase calculations, received signal strength calculations, time difference of arrival, trilateration, multilateration, combinations thereof, and/or other techniques.

As illustrated, the remote-control receiver 324 can pass information related to interaction with a corresponding remote-control device 362 to the control module 306 of the information linking device 302. The control module 306 of the information linking device 302 (or the remote control receiver 324) can then process the received information, send commands to vehicle controllers and modules 320, take action based upon a known location of the materials handling vehicle 108 via information collected from the environmental-based location tracking device 322 and/or other sensors on the materials handling vehicle 108, communicate the collected information to a remote server (e.g., server 112 of FIG. 1), take action based upon information received from the remote server, combinations of thereof, etc.

In an example embodiment, in response to the operator actuating a control (e.g., pressing a button) on the remote control device 362, circuitry within the remote control device 362 wirelessly transmits a control signal to the remote-control receiver 324. The remote-control receiver 324 passes the received control signals to a controller (e.g., a dedicated controller within the remote-control receiver 324, the control module 306, or other processing device within the materials handling vehicle 308). Regardless of where the controller is located, the controller implements the appropriate response to the received commands to carry out the technology feature. The information linking device 302 can also send a corresponding vehicle record to the server 112 (FIG. 1), as described more fully herein.

The response implemented by the controller to wirelessly received commands, e.g., via a wireless transmission by the remote-control device 362 may trigger the materials handling vehicle 308 to take one or more actions, or inaction, depending upon the logic that is being implemented. Positive actions may comprise controlling, adjusting or otherwise affecting one or more components of the materials handling vehicle 308. The controller may also receive information from other inputs, e.g., from sensors 314 such as the presence sensors 242 (FIG. 2), the obstacle sensors 258 (FIG. 2), switches, load sensors, encoders and other devices/features available to the materials handling vehicle 108 to determine appropriate action in response to the received commands from the remote-control device 362. For instance, in some embodiments, sensors communicate directly across the vehicle network 318. Thus, sensor data read across the vehicle bus 318, e.g., a current state of a presence sensor, a current state of the obstacle sensors 258 (FIG. 2), etc., may influence, cancel, change, or otherwise affect an otherwise proper command from the remote-control device 362.

In an exemplary arrangement, the remote-control device 362 is operative to wirelessly transmit a control signal that represents a first type signal such as a travel command to the remote-control receiver 324 on the materials handling vehicle 108. The travel command is also referred to herein as a "travel signal", "travel request" or "go signal". Upon acknowledgement of a travel request, the controller interacts with the one or more controllers 320, e.g., traction motor controller, steering controller, brake controller, combination thereof, etc., either directly or indirectly, e.g., via the vehicle network to advance the materials handling vehicle.

In an example embodiment, the travel request is used to initiate a request to the materials handling vehicle 308 to travel, e.g., for as long as the travel signal is received by the remote-control receiver 324 and/or sent by the remote-control device 362. As another example, the travel request may be configured to initiate a request to the materials handling vehicle 308 to travel a predetermined amount, e.g., to cause the materials handling vehicle 308 to advance in a first direction by a limited travel distance, or for a limited time.

Still further, the controller may be configured to "time out" and stop the travel of the materials handling vehicle 108 based upon a predetermined event, such as exceeding a predetermined time period or travel distance regardless of the detection of maintained actuation of a corresponding control on the remote-control device 362.

Stopping the materials handling vehicle 308 may be implemented, for example, by either allowing the materials handling vehicle 308 to coast to a stop or by initiating a brake operation to cause the materials handling vehicle 308 to brake to a stop. In an example configuration, the controller communicates one or more controllers 320, e.g., the traction motor controller, steering controller, brake controller, combination thereof, etc., via vehicle network 318 to terminate remote-controlled travel of the materials handling vehicle. For instance, the brake controller controls vehicle brakes to decelerate, stop, control the speed of the materials handling vehicle 308, or otherwise allow the materials handling vehicle 308 to coast to a stop.

The remote-control device 362 may also be operative to transmit a second type signal, such as a "stop signal", designating that the materials handling vehicle should brake and/or otherwise come to rest. The second type signal may also be implied, e.g., after implementing a "travel" command, e.g., after the materials handling vehicle has traveled a predetermined distance, traveled for a predetermined time, etc., under remote-control in response to the travel command. If the controller determines that a wirelessly received signal is a stop signal, the controller sends a signal to the traction motor controller, the brake controller and/or other vehicle electronic component to bring the materials handling vehicle to a rest. As an alternative to a stop signal, the second type signal may comprise a "coast signal" or a "controlled deceleration signal" designating that the materials handling vehicle should coast, eventually slowing to rest.

The time that it takes to bring the materials handling vehicle to a complete rest may vary, depending for example, upon the intended application, the environmental conditions, the capabilities of the particular materials handling vehicle, the load on the materials handling vehicle and other similar factors. For example, after completing an appropriate jog movement, it may be desirable to allow the materials handling vehicle to "coast" some distance before coming to rest so that the materials handling vehicle stops slowly. This may be achieved by utilizing regenerative braking to slow the materials handling vehicle to a stop. Alternatively, a braking operation may be applied after a predetermined delay time to allow a predetermined range of additional travel to the materials handling vehicle 308 after the initiation of the stop operation. It may also be desirable to bring the materials handling vehicle to a relatively quicker stop, e.g., if an object is detected in the travel path of the materials handling vehicle or if an immediate stop is desired after a successful jog operation. For example, the controller may apply predetermined torque to the braking operation. Under such conditions, the controller may instruct the brake controller to apply the brakes to stop the materials handling vehicle. All such parameters can be tuned, e.g., in response to workflows, examples of which are described more fully herein.

Moreover, the controller may be configured to perform various actions if the materials handling vehicle 108 is traveling (or is instructed to travel) under remote-control in response to a travel request. For instance, the materials handling vehicle 308 may stop upon detecting an obstacle in one or more of the detection zone(s), e.g., detection zones Z1, Z2, Z3 (FIG. 2). The controller may refuse to acknowledge a received travel request, e.g., if an operator is on the materials handling vehicle 308 (e.g., as determined by the presence sensors 146 (FIG. 2)). Similarly, if the obstacle sensors 258 (FIG. 2) detect that an object, including the operator, is in a detection zone of the materials handling vehicle 108, the controller may refuse to acknowledge a travel request from the remote-control device 362.

In some example embodiments, the information linking device 302 can include a badge communicator 328. The badge communicator 328 includes a transceiver for short range communication with suitably configured electronic badges in the vicinity of the badge communicator 328, e.g., by way of non-limiting example, in the range of about 15-20 meters or less. The badge communicator 328 can communicate using any proprietary or standardized communication protocol including Bluetooth (over IEEE 802.15.1), ultra-wideband (UWB, over IEEE 802.15.3), ZigBee (over IEEE 802.15.4), Wi-Fi (over IEEE 802.11), WiMax (over IEEE 802.16), RF for interacting with badges implemented as RFID tags, etc.

In certain illustrative implementations, the electronic badges are to be worn by pedestrians, workers, materials handling vehicle operators, etc. Moreover, electronic badges can be mounted to mobile equipment, materials handling vehicles or other moving objects. On the other hand, certain electronic badges may be stationary, such as where mounted to the end of an aisle, on racking, above doorways or near breakrooms, along the floor to cookie crumb paths, or in other situations where the electronic badge is not intended to move.

In certain illustrative implementations, the badge communicator 328 includes at least three antennae 326. The availability of multiple antennae 326 allows not only signal detection, but also positioning within the detection region. Here, the badge communicator 328 computes position via time of flight calculations, phase calculations, received signal strength calculations, time difference of arrival, trilateration, multilateration, combinations thereof, and/or other techniques.

As illustrated, the display 330 is coupled to the vehicle network system 318. The display 330 provides information to the operator that can be generated by one or more components (e.g., a module 320), by the control module 306, from the analysis engine 114 (FIG. 1) via the transceiver 304 (e.g., to display truck data from the materials handling vehicle data source 118, to display WMS data from the WMS data source 120, to display labor data from the LMS data source 122, to display geo-based event data from the GEO data source 124, etc.). In example embodiments, the display 330 provides a graphical user interface that enables an operator to interact with functions of the materials handling vehicle 308, interact with programming and data exchanges with the remote server 112 (FIG. 1) via the information linking device 302, combinations thereof, etc.

Materials Handling Vehicle Feature Monitor

Figure 4:
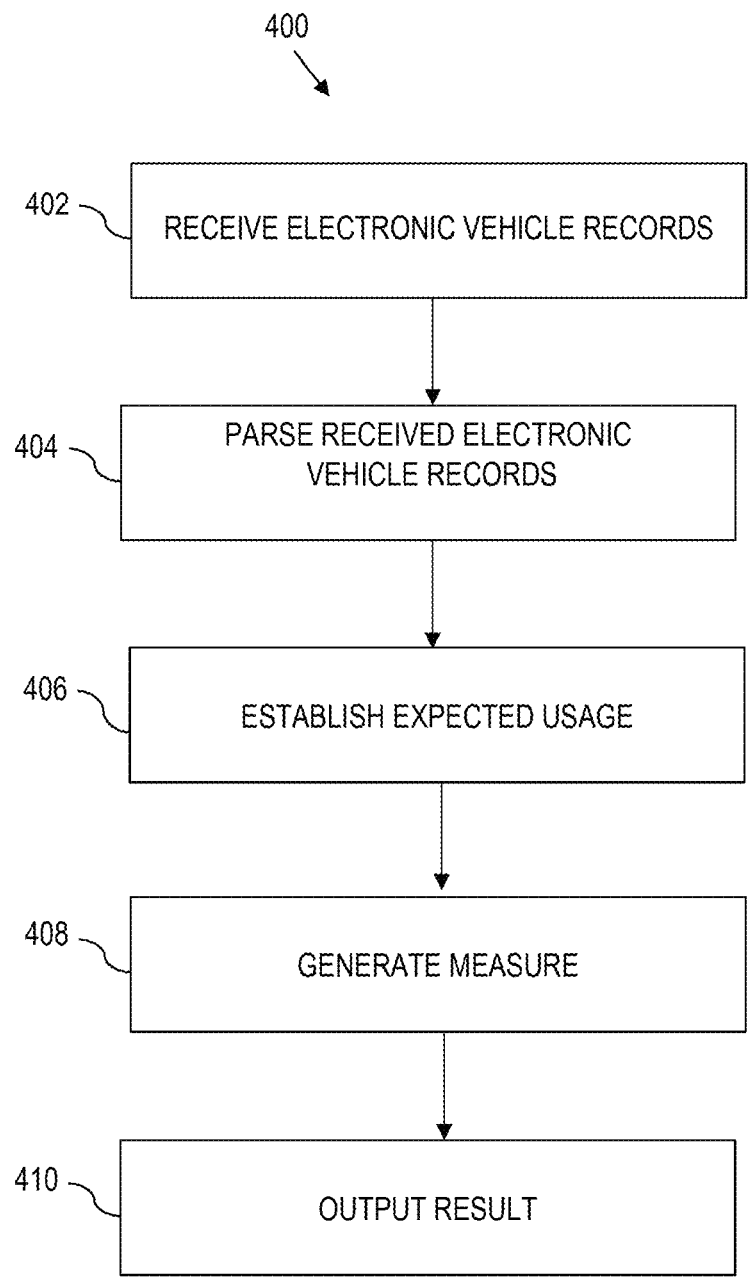
FIG. 4 is a block diagram of a system for usage and usage trend technology feature monitoring and control.

Referring to FIG. 4, according to aspects of the present disclosure, a process 400 for implementing a materials handling vehicle feature monitor is provided. The process 400 is applicable to technology features described throughout this disclosure.

The process 400 comprises receiving at 402, wirelessly, from a fleet of materials handling vehicles, electronic vehicle records.

The process 400 also comprises parsing at 404, the vehicle records for each vehicle operator to extract dashboard data.

The process 400 further comprises establishing, at 406, an expected usage.

The process 400 still further comprises generating, at 408, for each operator, an electronic measure, e.g., based upon the particular technology feature implemented.

Also, the process 400 comprises outputting at 410, a result. For instance, the process 400 can output to a dashboard, a graphical representation of the generated measurements, trigger a workflow, take other action, etc., as set out in greater detail herein.

Usage Technology Feature Monitoring-Remote Controlled Travel Function

Figure 5:
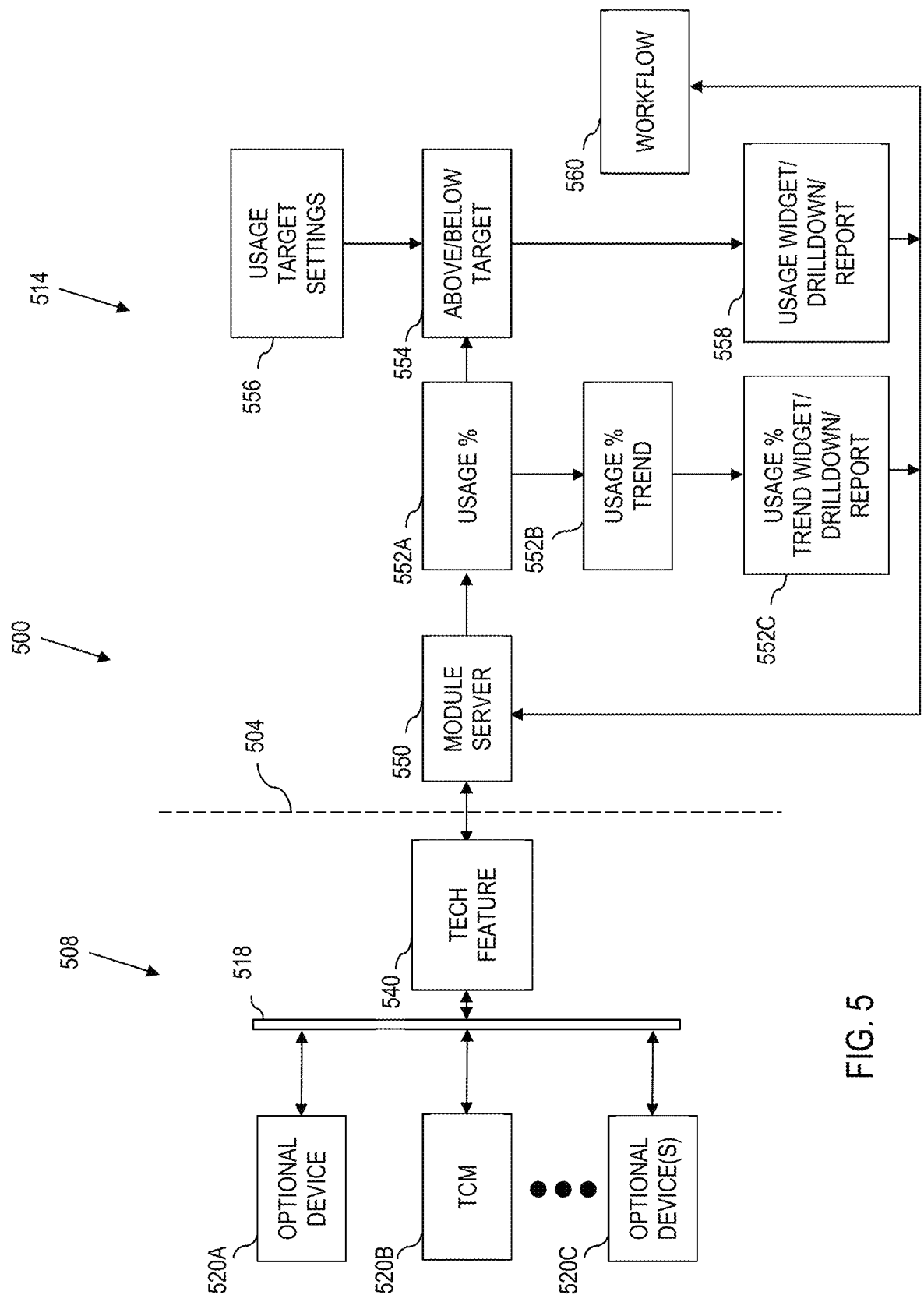
FIG. 5 is a process for implementing a materials handling vehicle feature monitor.

Referring to FIG. 5, a usage and/or usage trend block diagram 500 illustrates an example of the communication between a materials handling vehicle and a remote server to carry out aspects of monitoring and automated materials handling vehicle control responsive to technology usage monitoring, according to aspects herein. The illustrated block diagram 500 is suited for a technology feature such as a remote-controlled travel function, but can be applied to other technology features. Moreover, the diagram 500 provides a scheme suitable to carry out the process 400, FIG. 4.

The block diagram 500 can be implemented for example, by a materials handling vehicle 108 (FIG. 1); 208 (FIG. 2); 308 (FIG. 3) communicating with a remote server 112 (FIG. 1), e.g., via an information linking device 102 (FIG. 1); 202 (FIG. 2); 302 (FIG. 3).

As illustrated, electronics in a materials handling vehicle 508 communicate with an analysis engine 514 (e.g., analogous to platform 114, FIG. 1) by communicating wirelessly, e.g., across a network 504 (analogous to network 104, FIG. 1).

During normal operation, a vehicle operator may engage a technology feature 540, e.g., activate a remote control button (remote control 262, FIG. 2; 362, FIG. 3) that communicates with a remote control receiver (324, FIG. 3) to request a remote-controlled travel function.

Responsive thereto, various modules on the materials handling vehicle 508 respond to carry out the technology feature functionality. In this regard, information and messaging is communicated across a vehicle network 518.

By way of illustration, a vehicle network 518 (analogous to vehicle network 318, FIG. 3) facilitates communication between a plurality of control modules 520 (analogous to control modules 320, FIG. 3). For instance, optional control module 520A can comprise a sensor control module (SCM) 520A or other suitable control module or other network-enabled device. Optional control module 520B can comprise a traction control module (TCM) 520B, which controls travel of the materials handling vehicle 508. The system can also optionally include other network-enabled devices, e.g., schematically illustrated as control module 520C, e.g., a steering module, braking module, etc. Moreover, one or more additional electronic components may also contribute, examples of which are described with reference to FIG. 3.

As schematically illustrated, the technology feature 540 itself can include electronics that function as a boundary intermediary, e.g., to control the flow of information related to the technology feature usage (or lack thereof) between the corresponding materials handling vehicle 508 and a remote server 514. In other embodiments, this functionality can be carried out by other electronics (e.g., information linking device 302, as described with reference to FIG. 3). The technology feature 540 (or other device) interact with the control modules 520 and/or other vehicle electronics to collect information, to send commands, send reports to the remote server 514, receive information back from the remote server 514, carry out the technology feature, etc. For instance, in an example embodiment, the technology feature 540 collects and/or reads sensor active state information from the SCM 320A, speed information from the TCM 320B, remote control usage from a module such as the remote control receiver (324, FIG. 3), etc., by communicating across the vehicle network 518 (e.g., a CAN bus).

The technology feature 540 further wirelessly communicates (directly or via a transceiver, information linking device, etc.) with the remote server 514 via a remote module server 550, e.g., via Wi-Fi, cellular, etc. The information communicated to the module server 550 can include the information collected from the various modules 520A-520C or other devices on the materials handling vehicle, as well as other information that is measured, computed, logged, received, or otherwise obtained by or for the technology feature 540. For instance, in the example of a remote controlled travel function, the technology feature 540 can report guidance usage by including a distance the vehicle traveled under remote control, a distance traveled not using remote control, the operator ID, vehicle ID, time, other relevant data, or combinations thereof. In some embodiments, the technology feature 540 can report information, which may include information directed to a lack of use of a corresponding technology feature.

In some embodiments, the technology feature 540 can send records at predetermined intervals, every X seconds (where X is any integer), e.g., every minute, every 5 minutes, every 30 minutes, every hour, every usage, every login, every logout, whenever new data is available, dynamically based upon conditions, etc. Here, the specific configuration will likely dictate and control the timing.

The module server 550 can be implemented as a module server functioning on a remote server as part of an analysis engine (e.g., analogous to the analysis engine 114, FIG. 1). The module server 550 feeds an Extract, Transform, Load (ETL) Pipeline, which comprises a set of processes that extract data from the input received from the technology feature 540. The processes in the ETL pipeline collectively transform the data, and then load the data into an output destination for reporting, analysis, and data synchronization.

For instance, ETL processes can include a usage percentage process 552A that extracts data from the data collected by the module server 550, which corresponds to a percentage that each operator used an associated technology feature. From the collected data, a usage trend process 552B extracts trends of technology usage (e.g., trends of remote travel usage). The output of the usage percentage process 552A and/or usage trend process 552B is a usage percentage trend widget 552C. The usage percentage trend widget 552C can include graphical widgets, visual outputs, interactive outputs, drill down reports, etc. In this regard, the widget can function as a dashboard by displaying real-time (or near real-time) updates to the data collected by the ETL pipeline.

In some optional embodiments, the data collected into the usage percentage process at 552A can be further evaluated, such as by an above/below target process 554, which compares the percentage usage determinations with established threshold(s). In an example implementation, the above/below target process 554 receives inputs from usage target settings 556 to evaluate the percentage usage measurements recorded into the percent usage process 552A. In this regard, the above/below target process 554 outputs a usage widget 558, which outputs a widget that includes drilldowns, reporting, a combination thereof, etc.

The usage percentage trend widget 558 provides one or more visual metaphors that graphically illustrate usage and trend information. For example, a circle chart can illustrate a measure of the percentage of operators that satisfy a programmed target usage compared to those operators that are below target for the automation feature (e.g., operators that under-utilize the feature). A trend chart can extend the data to correspond to average utilization (in-target compared to below target) across a predetermined data range. The data associated with the technology feature 540 can also enable the system to track interruptions (e.g., a lost connection with a remote (or other external devices); deactivation of a tracked automation feature by a user; unintended deactivation, such as due to low battery, technical malfunction; unexpected stops, such as due to obstacle detection or pedestrians close to AGV, etc.) to the associated automation feature.

Yet further, the output of the processing at the server can trigger a workflow 560, described more fully herein.

The widgets bring about a technical advantage in being able to visualize not only technology feature usage, but also trends (including trends for groups of operators, e.g., based on operator shift, operator department, or a facility in which the operators work, etc.) issues using the technology feature, etc. For instance, in some embodiments, the system provides feedback commands to the materials handling vehicle 508. Feedback can be provided to tune the specific technology feature, such as to perform a software upgrade, calibrate, tune, arrange set points, set an operating range, adjust a frequency, or other parameter that can affect performance of the technology feature. In some embodiments, feedback commands are provided to an operating environment, such as to perform a software upgrade, calibrate, tune, arrange set points, set an operating range, adjust a frequency, or adjust other parameter that can affect performance of the technology feature or otherwise control peripherals that assist the associated technology feature. For instance, detected poor performance in a remote controlled travel function can be due to poor Bluetooth signal strength, the need for calibration, etc.

In some embodiments, feedback commands are provided to provide coaching, feedback, trigger workflows to implement remediation, optimize performance, improve the functioning of the corresponding materials handling vehicle itself, such as by adjusting controller setpoints to control speed, lift height, etc.

Here, the materials handling vehicle may interact with the module server 550 to communicate information back to a materials handling vehicle, by interacting with the workflow 560, e.g., to communicate directly with a remote server, remote controller, remote maintenance scheduler, or remote equipment (e.g., RFID tags, ultra-wideband badges, transponders, mesh processors, positioning system components such as environmental location-based markers deployed in a work environment, etc.) to call in maintenance, to performance tune the equipment, to disable the equipment, to enable the equipment, combinations thereof, etc.

For instance, a root cause of underutilization of a given technology feature such as remote-controlled travel, may be traced to poor transmitter health (e.g., weak battery, broken antenna, poor pairing stability, etc., in the remote control 262, FIG. 2; 362, FIG. 3) that is impacting the performance. Low transmitter health may be difficult or otherwise not detectable absent aspects herein. As such, the utilization of the technology feature may actually stimulate correction of assistive technology in the operating environment of the materials handling vehicle. Moreover, interruptions or trends in technology usage can indicate an equipment issue, such as a mechanical defect that might not otherwise be detectable by electronic event/error codes alone.

Remote-Controlled Travel Example

As noted more fully herein, a remote-controlled travel function can help operators such as low-level order pickers be more productive and less fatigued through remote-control of an associated order picker. An operator that uses the wireless remote-control technology correctly, can pick significantly more cases per hour without changing any other behaviors. This productivity increase may be measurable through a corresponding warehouse management system (WMS). However, knowing when to ideally use the wireless remote-control technology (instead of stepping onto an operator platform to drive the order picker) requires some expertise, which is typically enabled through onboarding and experience.

By way of example and not by way of limitation, assume that a vehicle travel distance to a next pick location falls below a first threshold. Here, the proper response is for the operator to user the remote control device to remotely control the materials handling vehicle to advance to the appropriate destination. On the other hand, where the travel distance to the next pick location is equal to, or exceeds the first threshold, then the proper response is for the operator to step onto and drive the materials handling vehicle to the destination in a conventional manner. The distance of the first threshold can vary based upon a number of factors, including environment, truck performance tuning and/or features, operator skill, etc.

Analogously, in some applications, a travel distance to a next pick location that falls below a second threshold should require the operator to walk to that next pick location. However, a travel distance to a next pick location that is at or greater than the second threshold (and optionally below the first threshold) should be traveled using the wireless remote-control technology. In yet other embodiments, the remote control device should be used to remotely control the materials handling vehicle to advance to the appropriate destination when the distance to the destination falls within a range, e.g., defined between the first threshold and the second threshold (minimum and maximum travel distance). Thus, the proper response is for the operator to use the remote control device to remotely control the materials handling vehicle to advance to the appropriate destination. Again, the distance of the second threshold can vary based upon a number of factors, including environment, truck performance tuning and/or features, operator skill, etc.

In some embodiments, feedback from the workflow 560 can be information to the operator e.g., coaching. For instance, assume that an operation was done improperly, such as operating the remote-controlled travel function for too short or too long a distance to a next pick. Here, the operator should have walked or ridden on the last pick and thus an instruction can be given, e.g., from the workflow 560 back to the display on the materials handling vehicle (retrospective). In another embodiment, an app on the materials handling vehicle (e.g., a materials handling vehicle feature monitor) consults the WMS and the system tells the operator, e.g., via a prompt, tone, light, message, etc., whether to walk or ride (prospective). That is, the app is dynamic, checking on the status of the next (upcoming) pick operation so that the operator can receive real-time, on demand coaching as to how to use the remote control feature. In yet other alternative embodiments, the system uses WMS data and current operating data to allow/deny/override operator actions. Here, the system can refuse to jog the vehicle when a jog is not considered the most efficient operation by the app. Here, an optional warning can be provided, e.g., via a message, light, sound, haptic response, etc. On the other hand, where an operator should use the remote control feature, the app can alert the operator that the next pick presents an opportunity to use the remote control feature.

If all operators of order pickers use wireless remote-control technology properly, the overall productivity of a facility is increased. Correspondingly, insufficient or incorrect use of a wireless remote-control technology can reduce (or in some cases eliminate) the achievable productivity gains associated with the wireless remote-control technology. In this regard, currently, distribution center (DC) managers or team leaders have no data to identify operators who do not use the wireless remote-control technology enough or correctly.

Moreover, insufficient or incorrect wireless remote-control technology usage could be caused by an operator using a wireless remote-control technology enabled materials handling vehicle, but not pairing a remote-control with the materials handling vehicle. Insufficient or incorrect wireless remote-control technology usage can also be caused by an operator having paired a remote but not operating the remote. Yet further, insufficient or incorrect wireless remote-control technology usage can be caused by an operator operating the remote-control either not often enough, or too often. Insufficient or incorrect wireless remote-control technology usage can also be caused by technical issues (e.g., low remote battery, pairing issues, mechanical wear of switches or other components, etc.).

As an example, if an app running on the materials handling vehicle detects that a materials handling vehicle is moving with no remote control paired to the corresponding remote control receiver, the system can take an action, e.g., performance tune the materials handling vehicle to operate differently, put up a message, require a pairing, etc. For instance, a feature can be added or removed, e.g., to provide some performance incentive to pair.

As still another example, if the app detects that pairing is inactive but the materials handling vehicle has moved or done something, the system can take action (e.g., via an output to the operator, via performance tuning to modify truck capability, providing some indicator that the truck is not properly being used, etc.).

If the app detects a connectivity problem, e.g., low battery, charge process failure, failed pair attempt, the platform can initiate automatic remediation actions, e.g., to reprogram the feature to operate at a shorter distance to conserve power, turn down the range in the remote control, limit the number of operations of the remote control, etc., to extend battery life. The app may also attempt to remediate pairing issues, e.g., by changing a discovery process, etc. For instance, where pairing is initiated by the operator initiating a pairing request on the display, then pushes a button on the remote control to pair and the request fails, e.g., due to too many operators trying to pair a device, the discovery process can reconfigure, e.g., so that the truck starts automatic pairing, e.g., looking for a remote with strongest signal (e.g., via RSSI). If a remote has a signal strength greater than a predetermined threshold, the system can pair.

Referring back to FIG. 4, in an example embodiment, each electronic record received at 402 can comprise travel-related data, e.g., recorded by a controller on an associated materials handling vehicle being operated in a work environment by a corresponding operator as set out with regard to FIG. 1-FIG. 3, and FIG. 5. Each record can also include an operator identification of the corresponding operator of the materials handling vehicle.

As a few additional illustrative examples, the electronic vehicle records may indicate whether travel of a corresponding materials handling vehicle occurred while a remote-control device was not paired to a remote-control receiver, whether travel of a corresponding materials handling vehicle occurred while a remote-control device was paired to a remote-control receiver, etc. The electronic vehicle records can also enable a determination that travel of a corresponding materials handling vehicle occurred as a result of operation of a control feature on the remote-control device paired to the remote-control receiver of the corresponding materials handling vehicle to implement the remote-controlled travel function. The electronic vehicle records can also be used to indicate an amount of time that a remote-control device is paired to a remote-control receiver of the corresponding materials handling vehicle.

In some embodiments, the received electronic record data is parsed at 404, into a travel distance that the materials handling vehicle has traveled responsive to the corresponding operator using a remote-controlled travel function over a predetermined time period, and/or a total travel distance that the materials handling vehicle has traveled over the predetermined time period.

The process at 406 can establish expected usage by establishing travel distance under remote control to total travel distance, e.g., for the predetermined period of time. In some embodiments, the established expected travel distance under remote control to total travel distance at 406, can comprise establishing the expected travel distance under remote control to total travel distance as a range of ratios of travel distance to total travel distance. In this regard, outputting to a dashboard, a graphical representation of the generated measurements can comprise outputting a remote-control usage trend graph that trends a comparison of operator utilization of a control feature on a remote-control device paired to a remote-control receiver of the corresponding materials handling vehicle to implement the remote-controlled travel function, to the range, over time. As an example, the graph can provide a graphical representation of a historical development of operators' average usage of the remote-control device. Moreover, the dashboard can graphically output a detail that provides a graph for each individual and a comparison graph defining other individuals or the average of all operators within a user configured filter setting. Here, a usage target can be visually highlighted (e.g., using color, shading, or other indicia) so as to differentiate when the target was achieved and when the target was not achieved.

In some embodiments, the underlying data and/or computations can be utilized to drive a gamification process, e.g., to enable an operator to directly compare their performance against a target performance.

The process at 408 can comprise, for each operator, generating an electronic measurement of the expected travel distance under remote control to total travel distance for the predetermined period of time compared to the recorded travel distance under remote control to total travel distance for the predetermined period of time.

In some embodiments, the measurement generated at 408 can comprise an expected travel distance under remote control to total travel distance computed by establishing the expected travel distance under remote control to total travel distance as a range of ratios of travel distance under remote control to total travel distance. For instance, an example range may be 57%-83% expected travel distance under remote control to total travel distance. Of course, the above example range is purely exemplary.

As another example, the range of ratios of travel distance under remote control to total travel distance can be set by programming different ranges of ratios of travel distance to total travel distance based upon metadata associated with the received electronic vehicle records. For instance, the range may be 57%-83% for first shift operators, but only 15%-40% for second shift operators. As another example, the range may be 30%-45% for operators working in a first portion of a warehouse, but 55%-75% for operators working in a second portion of the warehouse, etc. Thus, programming ratio ranges may be based upon at least one of: different locations, different work shifts, different time ranges, different day ranges, different operator skill levels, or a combination thereof.

In some embodiments, the materials handling vehicle feature monitor outputs at 410, a dashboard as a graphical representation of the generated measurements. As an illustrative example, a graphical representation may comprise graphically generating a donut chart differentiating: operators performing above the target range in a first indicia for operators that operate the remote-controlled travel function at a level above the target range, operators performing below the target range in a second indicia different from the first indicia for operators that operate the remote-controlled travel function less than the target range, operators performing within the target range in a third indicia different from the first indicia and second indicia for operators that operate the remote-controlled travel function within the target range, or combinations thereof.

In some example embodiments, the dashboard implements a graphical representation of the generated measurements that characterize uses of the control feature compared to time the remote-control device is paired to the remote-control receiver. In another example, the dashboard can output a graphical representation of a user that is paired but does not operate the control feature of the remote-control device, a user that uses the control feature too infrequently compared to a target usage, a user that uses the control feature too frequently compared to the target usage parameter, combinations thereof, etc.

In another example embodiment, the system creates "user personas". By way of example, a user persona can be created that functions as a measure of how well an actual user is able to identify feature use cases and use the system accordingly ("competency"). Based on a user's individual competency, a corresponding WMS/ERP system assigns pick orders to individuals whose expertise matches the nature of a corresponding pick tour. For instance, a user who often fails to identify opportunities to use a feature (e.g., use of a remote control feature based upon a distance to the next pick location) could be assigned only tours with a high number of long inter-pick distances. As another example, an operator that demonstrates a tendency to over-use the feature can be assigned pick tours with a high percentage of short inter-pick distances. This way, through feature usage, user's weaknesses might be mitigated or even turned into assets.

In yet a further example embodiment, the materials handling vehicle feature monitor receives feedback from an operator of the graphical user interface selecting a usage detail by operator report, which causes the dashboard to output a graphical representation of a list of operators. This list can include a measure of their operation of a control feature on a remote-control device paired to the remote-control receiver of the corresponding materials handling vehicle to implement the remote-controlled travel function. The list can also include a measure of a percentage of time that the operator operated the materials handling vehicle with the remote-control device paired to the remote-control receiver compared to the time that the operator operated the materials handling vehicle with the remote control unpaired to the remote-control receiver. The list can still further include usage and paired time values that are averages aggregated over a user-selected time period.

The dashboard can also output a graphical representation of technical issues with a remote-control device paired to a remote-control receiver of the corresponding materials handling vehicle to implement the remote-controlled travel function. Example technical issues include a pairing failure, a number of materials handling vehicles currently being operated without a paired remote, a number of remote controls reporting a low battery, etc. By pairing the dashboard data with predictive maintenance, the system can automate maintenance/repair part ordering so that technical issues can be resolved in an expedited manner and based upon automated workflows.

By way of introduction and summary, the platform 114 can carry out a process that performs parsing of the vehicle records for each vehicle operator to extract dashboard data. Here, the dashboard data includes a travel distance under remote control that the materials handling vehicle has traveled, e.g., responsive to the corresponding operator using a remote-controlled travel function over a predetermined time period, and a total travel distance that the materials handling vehicle has traveled over the predetermined time period. The process still further comprises establishing an expected travel distance under remote control to total travel distance for the predetermined period of time. As noted above, the expected values can be user defined, and/or may be derived by the platform 114 from the materials handling vehicle information data source 118, the management system data source 120, the other data source(s) 122, combinations thereof, etc.

Yet further, the process implemented by the platform 114 can comprise generating for each operator, an electronic measurement of the expected travel distance under remote control to total travel distance for the predetermined period of time compared to the recorded travel distance under remote control to total travel distance for the predetermined period of time, and outputting to a dashboard, a graphical representation of the generated measurements. The dashboard can be output to a display on a materials handling vehicle, a desktop computer, etc.

Still further, the platform 114 can cooperate with a processor on a corresponding materials handling vehicle to carry out one or more of the functions, features, capabilities, etc., described more fully herein. In this regard, the platform 114 can function as a supervisor, the platform 114 can off-load processing to a processor on a materials handling vehicle, the platform can split processing duties with a processor on a materials handling vehicle, etc., examples of which are described in greater detail herein.

In some embodiments, the materials handling vehicle feature monitor can communicate back with a materials handling vehicle responsive to the analysis of data displayed in the dashboard. The communication back can be in the way of output to a display, e.g., to display the dashboard. The communication back can be via situational awareness, e.g., by flashing a light, outputting a coaching message to the display, etc.

Yet further, the communication back can be in the form of a control. Here, the control can affect performance of the materials handling vehicle, e.g., to performance tune the materials handling vehicle, e.g., to alter speed of travel under remote control, acceleration under remote control, braking, sensitivity of sensors, etc., to modify set points, or otherwise improve operation of the vehicle. In yet further embodiments, the communication back can be to tune the remote control system itself, e.g., to set ranges such as to modify a travel distance under remote control, modify jog operation, modify set points, control features, speed limits, braking requirements, utilization rules, etc.

For instance, the materials handling vehicle feature monitor can communicate a command back to a materials handling vehicle that reports a technical issue, to modify the performance of the materials handling vehicle to remedy the technical issue. The graphical representation of technical issues can also/alternatively be illustrated as a function of a real-time view with no historic data shown.

In another example, based upon the records and the pace of the operator, the system can dynamically change the remote travel operation to accommodate an operator's physical state to reduce fatigue, stress, and strain on the operator.

In some embodiments, the materials handling vehicle feature monitor retrospects a warehouse management system database and extracts therefrom, pick metrics. For instance, the pick metrics can comprise at least one of an average inter-pick distance, aisle lengths, pick patterns, historic pick lists, and combinations thereof. Retrospecting the warehouse management system can also comprise automatically evaluating warehouse management data for every pick run. This data can be used to modify the distance traveled under remote control, e.g., as dynamic, real-time updates, or via fixed distance updates.

In this regard, in some embodiments, the remote server can analyze electronic measurements of expected travel distance under remote control to total travel distance for a predetermined period of time compared to a recorded travel distance under remote control to total travel distance for the predetermined period of time. Responsive thereto, workflow can route a command back to the material handling vehicle, e.g., to initiate a modification to the materials handling vehicle. For instance, by querying task information, the processor can, for example, deny a remote start/remote travel command if a next pick operation is too far away from a current position of the materials handling vehicle. Analogously, the processor can deny a remote start/remote travel command where a next pick is too close to a current position of the materials handling vehicle. For instance, it may be more efficient for the pick operator to walk to the next location.

In an example embodiment, a user interacting with the dashboard via a graphical user interface can select within the dashboard view to launch a graphical representation of a usage detail by operator section, to filter which records contribute to the dashboards view, such that usage and paired time values output to the dashboard are averages aggregated over a time period chosen by the user interacting with the filter. Records can be selected into the dashboard view based upon at least one of a chosen location, a shift, a department, an operator skill level, a timeframe, or combination thereof.

In yet a further embodiment, the materials handling vehicle feature monitor electronically ranks the dashboard data, sorted by operator identification and graphically displays the ranked dashboard data such that the ranked dashboard data reveals operators that either use the remote-controlled travel enough, or that do not use the remote-controlled travel enough.

Figure 6:
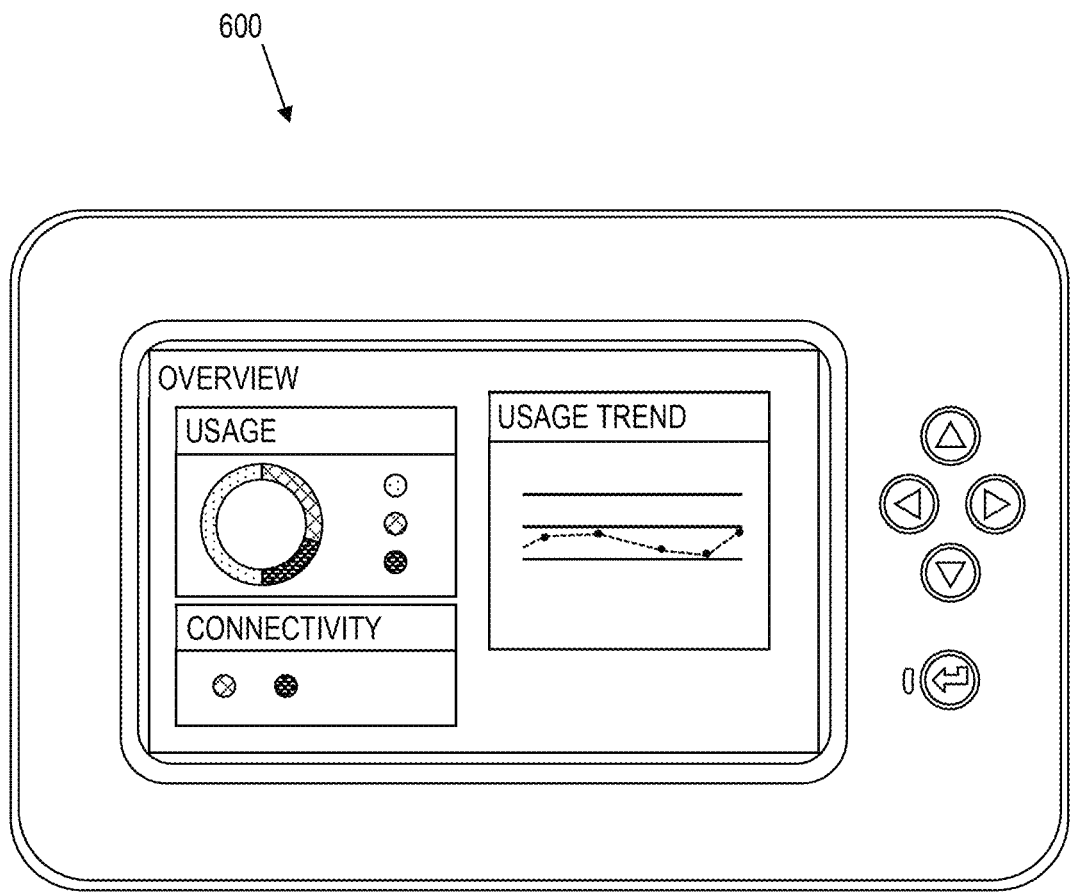
FIG. 6 is a schematic illustration of a display, which can be mounted on a materials handling vehicle, where a graphical user interface presents a dashboard of technology feature metrics.
Figure 7:
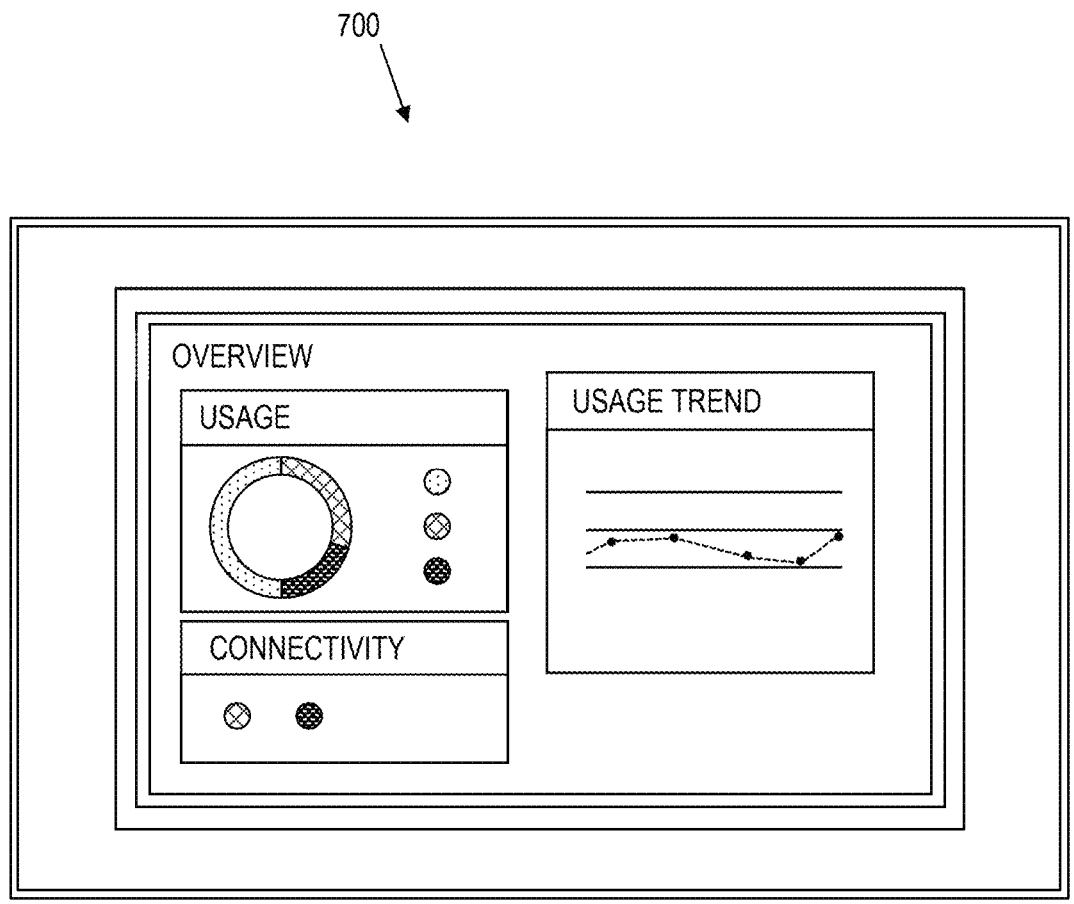
FIG. 7 is a schematic illustration of a display, where a graphical user interface presents a dashboard of technology feature metrics.

As a specific example, reference is drawn to FIG. 6 and FIG. 7, which show a dashboard on a display on the materials handling vehicle (FIG. 6) for operator interaction, and a dashboard display (FIG. 7) on a computer display, e.g., a desktop computer display, a smartphone display, a tablet display, etc., for a manager, etc.

Working Example

By way of example, a feature app in fleet management software (e.g., running on the platform 114-FIG. 1, running as a program on the control module 306 on a materials handling vehicle-FIG. 3, combination thereof, etc.) collects electronic vehicle records (e.g., see 402-FIG. 4). The electronic vehicle records can include feature specific (e.g., travel related) information that is collected from a corresponding materials handling vehicle. Example travel information can include overall travel distance per logged operator out of the total travel remote travel responsive to remote control and manually driven distance. The feature app then uses these two data sets to generate a usage percentage. For instance, when run by a server, the platform 114 can compute a usage percentage for every operator. For instance, an example usage can be established as $Usage_{Feature} = d_{remote}/d_{total}$.

Through an initial assessment of the warehouse and representative WMS data, the feature app can establish an expected ratio of remote controlled travel over total travel for any facility. As such information may be an estimate. In this regard, the feature app may optionally add some margin of error around that value, so that a location-specific usage target area is created. For example, a usage target for an enterprise's location A could be 25%-38%, for their location B it could be 12%-20%.

The feature app then compares every individual operator's feature usage percentage to the location's feature usage target and also calculates average usage values for groups of operators (e.g. teams or shifts).

The feature app can visualize the data in widgets and associated detail pages. Referring briefly to FIG. 6, a graphical user interface 600 on a display (e.g., display 330, FIG. 3) illustrates two widgets that are viewable on a materials handling vehicle. Comparatively, FIG. 7 illustrates a graphical user interface 700 on a display that illustrates widgets on a computing device such as a tablet, laptop, computer display, smartphone display, etc.

Feature Usage Widget

With reference generally to FIG. 6 and FIG. 7, by way of example, a first widget, illustrated to the left in the display, visualizes a donut chart that breaks up all feature usage operators in the chosen location, shift, department and timeframe into the following groups:

a) Above Target: operators who move their materials handling vehicles remotely more than expected. As this can lower feature-associated productivity gains only slightly, this group is illustrated with a first indicia, e.g., a color code for this group in the app displayed in yellow.

b) Below Target: operators who move their materials handling vehicles remotely less than expected or not at all. As this can cause severe productivity losses, this group is represented with a second indicia different from the first indicia, e.g., by a color code for this group in the app displayed in red.

c) Target Usage: all operators who move their materials handling vehicles remotely within the target percentage. This is represented by a third indicia different from the first indicia and the second indicia, e.g., by a color code for this group in the app displayed in green.

In an example user experience, clicking on any number will take the user to a usage detail by operator section. The Usage Detail by Operator section provides a list of operators with their respective feature and paired time percentage ("How much of the overall logged time did the operator have a remote paired with the truck?"). The combination of both values helps users trouble-shoot reasons for low usage (or low WMS-productivity).

For example, an operator with low paired time percentages is expected to have low usage values, so a supervisor might talk to the operator and educate the operator about the benefits of the feature and why the operator should use the feature appropriately. On the other hand, operators with high paired time percentages but low usage might need additional training about how to best use the feature.

By way of example, an algorithm that computes usage detail can access WMS data and automatically calculate a theoretical maximum productivity measure for any given picker. The theoretical maximum productivity measure can be communicated back to the order picker and used as a basis to score the order picker, gamify a task by presenting a "score to beat" or "score to match", by presenting a visual metaphor that allows order pickers to track their actual performance against an ideal performance, or combination thereof.

As another example, by utilizing the computed theoretical maximum, a work cadence can be presented to the order picker, which presents a visual means to maintain an order picking pace.

For instance, in yet additional embodiments, the computed theoretical value can be utilized as a baseline "pace", which can be displayed to the operator on a display screen, or the pace can be represented by a pulse, tone, etc. Here, the algorithm can automatically tune/throttle/detune or otherwise change the theoretical maximum to the specific operator's ability, extrinsic factors, physiological factors, or combinations thereof. For instance, examples of an operator's ability include variables that track operator experience, knowledge and understanding of the tasks, experience with operating the remote control, etc. Example extrinsic factors include variables such as task difficulty, warehouse layout, characteristics of the materials handling vehicle that the operator is logged into, shift requirements, etc. Example physiological requirements can include variables that represent biometric measures, such as number of steps taken, number of times bending over, total weight lifted, average heartrate, etc., as measured on any interval, e.g., per hour, per shift, etc.

By presenting a "pace", an order picker cadence/pace is set that is controlled by the algorithm. In this regard, the algorithm can be dynamic, updating over a shift. In an example embodiment, the algorithm can tune the behavior of the technology feature based upon biometric limitations, capabilities, restrictions, etc., so that an order picker maintains steady output over a duration, e.g., shift, while staying within the physiological constraints set by the algorithm.

Thus, algorithm tuning need not be exclusively productivity-based. Rather, a technological improvement can be seen because the algorithm tunes to the operator's capability. Such cadence information can also be pushed back to the WMS so that pick allocation can be managed.

In implementations of features, there can be a direct connection between automation usage and picker productivity. In this case, with access to WMS data, the system can automatically calculate a theoretical maximum of picks/tasks for any given picker. This value is output to the operator, e.g., via a display on the truck. In this regard, a gamification can be provided, allowing an operator see, target, and attempt to beat a theoretical high score. Here, all usage and paired time values can be averages aggregated over the time period chosen in the timeframe filter above the list/widget.

Feature Usage Trend Widget and Detail

As yet another illustrative example, a feature usage trend widget and detail can present all individual data points comparing the average values in the usage widget and detail. The feature usage trend widget and detail can show the historic development of all operators' average usage, whereas the detail can provide a graph for each individual and a comparison graph (other individuals or the average of all operators within the filter settings). The usage target can be highlighted so that it is easily recognizable when the target was achieved and when it was not. In some embodiments, trends can be computed for groups of operators based on operator shift, operator department, or a facility in which the operators work, etc.

Connectivity Widget and Detail

As technical issues may limit an operator's access to a feature (e.g. pairing failed, etc.) and therefore ultimately lowers overall productivity, another example widget provides information about the number of materials handling vehicles currently being operated without a paired remote and/or the number of remote controls reporting a low battery which will over time lead to the remote disconnecting from the remote control receiver of the materials handling vehicle. The detail of this widget provides information about the associated operators, so that they can be addressed personally and the issue can be resolved. In some embodiments, this feature provides a real-time view (e.g., which may be limited based on the browser's refresh rate). Assuming no technical restrictions, this could happen in real-time and notify managers of current changes, e.g., operator ID corresponding to operator XYZ is now paired, etc.

Reports

In some embodiments, data files, e.g., comma separated value (CSV) files, that are generated for operators' average usage and usage trend can be exported to 3rd party tools, a spreadsheet, for direct comparison to data pulled from a WMS, etc.

Usage Technology Feature Monitoring

Figure 8:
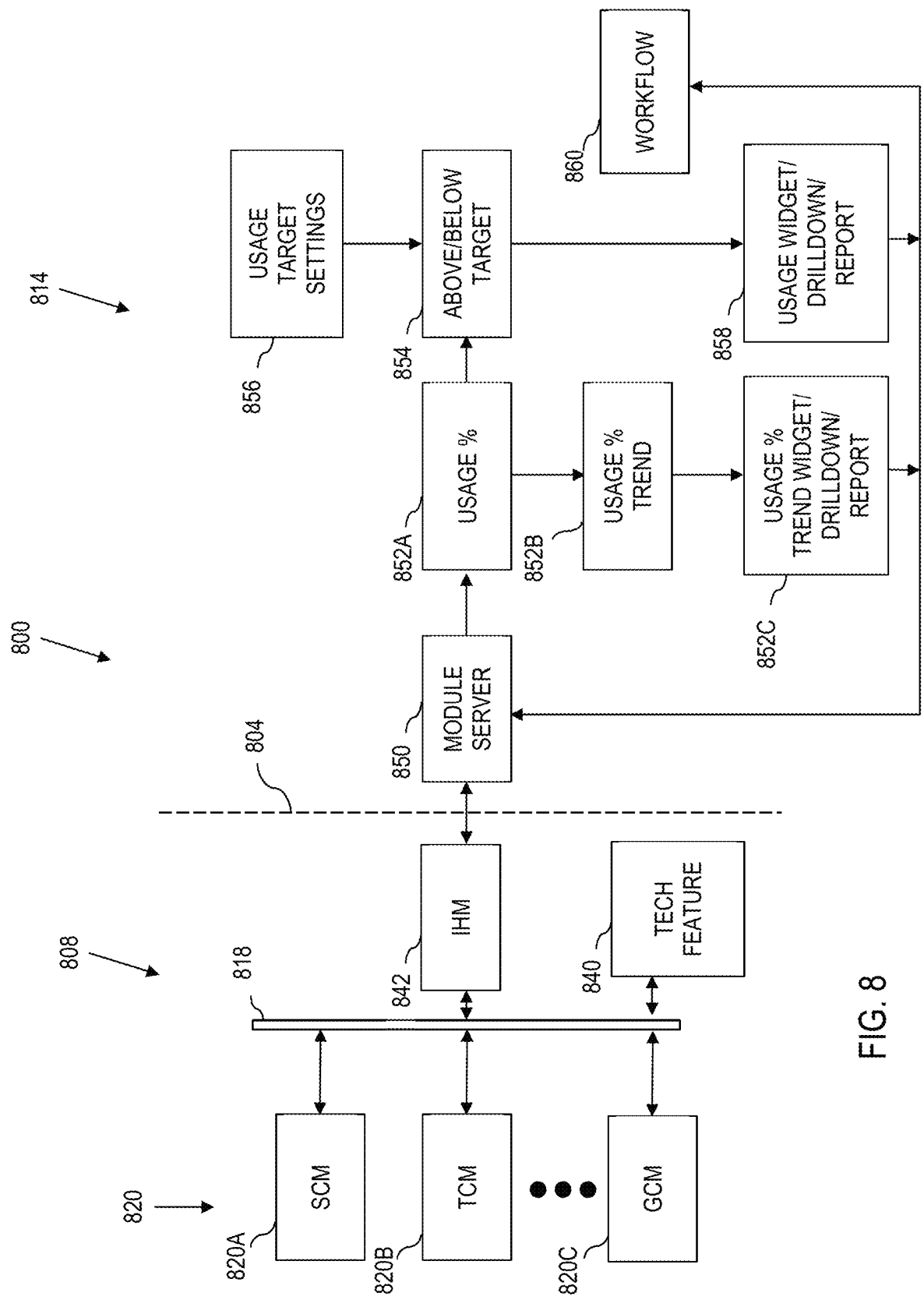
FIG. 8 is a block diagram of a system for usage and usage trend technology feature monitoring and control.

Referring to FIG. 8, a usage and/or usage trend block diagram 800 illustrates an example of the communication between a materials handling vehicle and a remote server to carry out aspects of technology usage monitoring, and automated materials handling vehicle control responsive to technology usage monitoring, according to aspects herein. The block diagram 800 can be implemented for example, by a materials handling vehicle 108, FIG. 1; 208, FIG. 2, 308, FIG. 3 communicating with a remote server 112, FIG. 1, e.g., via an information linking device 202, FIG. 2, 302, FIG. 3.

The diagram 800 is largely analogous to the diagram 500, FIG. 5. In this regard, like structure is illustrated with like reference numerals 300 higher in FIG. 8 compared to FIG. 5. As such, the disclosure of FIG. 5 is incorporated into the details of FIG. 8, and only those changes or differences are described in detail.

As illustrated in FIG. 8, electronics in a materials handling vehicle 808 communicate with an analysis engine 814 by communicating wirelessly, e.g., across a network 804, in a manner analogous to that set out with regard to FIG. 1.

Within the electronics of the materials handling vehicle 808, during normal operation, a vehicle operator may engage a technology feature 840, e.g., activate an auto-positioning system (APS), activate an autofence (AF), perform blending, press a remote automation button, operate a remote-controlled travel function, perform a technology function described more fully herein, etc. Responsive thereto, various modules on the materials handling vehicle 808 respond to carry out the technology feature functionality. In this regard, information and messaging is communicated across a vehicle network 818 among control modules 820, the technology feature 840 and optionally, other vehicle electronics (e.g., described with reference to FIG. 3). Example control modules 820 include a sensor control module (SCM) 820A, a traction control module (TCM) 820B, a guidance control module (GCM) 820C, etc.

Moreover, an industrial health monitor 842 is communicably coupled to the vehicle network 818. Different from the embodiment of FIG. 5, here, the industrial health monitor 842 functions as a boundary intermediary, e.g., to control the flow of information related to technology feature usage (or lack thereof) between the corresponding materials handling vehicle and a remote server. The industrial health monitor 842 interacts with the control modules 820 (and optionally, other vehicle electronics described with reference to FIG. 3) to collect information, to send commands, to interact with the control modules, etc. For instance, in an example embodiment, the industrial health monitor 842 collects technology information from the various control modules, such as by collecting automation active state information from the SCM 820A, speed information from the TCM 820B, guidance acquired state information from the GCM 820C, etc., by communicating across the vehicle network 818 (e.g., a CAN bus). In this regard, the industrial health monitor 842 can function as a common boundary intermediary for one or more technology features 840 and/or other electronic on the materials handling vehicle, allowing scalability and the ability to easily add technology features.

The industrial health monitor 842 further wirelessly communicates with a remote module server 850, analogous to that described with reference to FIG. 5. For instance, in the example of an APS system, the industrial health monitor 842 can report guidance usage by including a distance the vehicle traveled on wire, a distance on wire using auto-positioning, the operator ID, vehicle ID, time, other relevant data, combinations thereof. In some embodiments, the industrial health monitor 842 can report information, which may include information directed to a lack of use of a corresponding technology feature.

In some embodiments, the industrial health monitor 842 may query control modules to collect vehicle information. As another example, the industrial health monitor 842 can receive or otherwise read information circulated on a vehicle network (e.g., CAN bus) as part of the vehicle network 818. Yet further, the industrial health monitor 842 can read a current value of vehicle state data that is actively collected and stored in memory (e.g., in a data object model), which is indicative of usage (or lack thereof) of a corresponding technology feature, etc.

In an example embodiment, the industrial health monitor 842 can include an onboard processor and memory and can communicate across the vehicle network 818. Such a configuration allows the industrial health monitor 842 to collect and process any data that can be extracted across the vehicle network 818. The industrial health monitor 842 may also be able to process the received information, e.g., based upon programming loaded into memory, and then send processed (or unprocessed) data to the server.

The module server 850 can be implemented as a module server functioning on a remote server as part of an analysis engine 814 (e.g., analogous to the analysis engine 114, FIG. 1). The module server 850 feeds an Extract, Transform, Load (ETL) Pipeline, which comprises a set of processes that extract data from the input received from the industrial health monitor 842. The processes in the ETL pipeline may function in a manner analogous to that described with reference to FIG. 5, except directed to the corresponding technology feature.

For instance, ETL processes can include a usage percentage process 852A that extracts data from the data collected by the module server 850, which corresponds to a percentage that each operator used an associated technology feature. From the collected data, a usage trend process 852B extracts trends of technology usage. The output of the usage percentage process 852A and/or usage trend process 852B is a usage percentage trend widget 852C, e.g., analogous to that of FIG. 5, but directed to the associated technology feature.

In some optional embodiments, the data collected into the usage percentage process at 852A can be further evaluated, such as by an above/below target process 854, which compares the percentage usage determinations with established threshold(s). In an example implementation, the above/below target process 854 receives inputs from usage target settings 856 to evaluate the percentage usage measurements recorded into the percent usage process 852A. In this regard, the above/below target process 854 outputs a usage widget 858, which outputs a widget that includes drilldowns, reporting, a combination thereof, etc.

The usage percentage trend widget 858 provides one or more visual metaphors that graphically illustrate usage and trend information. For example, a circle chart can illustrate a measure of the percentage of operators that satisfy a programmed target usage compared to those operators that are below target for the automation feature (e.g., operators that under-utilize the feature). A trend chart can extend the data to correspond to average utilization (in-target compared to below target) across a predetermined data range. The data from the industrial health monitor 842 can also enable the system to track interruptions (e.g., a lost connection with a remote (or other external devices); deactivation of a tracked automation feature by a user; unintended deactivation, such as due to low battery, technical malfunction; unexpected stops, such as due to obstacle detection or pedestrians close to AGV, etc.) to the associated automation feature.

Yet further, the output of the processing at the server can trigger a workflow 860, described more fully herein.

The widgets bring about a technical advantage in being able to visualize not only technology feature usage, but also trends, and issues using the technology feature. For instance, in some embodiments, the system provides feedback commands to the materials handling vehicle. Feedback can be provided to tune the specific technology feature, such as to perform a software upgrade, calibrate, tune, arrange set points, set an operating range, adjust a frequency, or other parameter that can affect performance of the technology feature. In some embodiments, feedback commands are provided to an operating environment, such as to perform a software upgrade, calibrate, tune, arrange set points, set an operating range, adjust a frequency, or adjust other parameter that can affect performance of the technology feature or otherwise control peripherals that assist the associated technology feature. For instance, detected poor performance in an APS can be due to poor RFID signal strength, the need for calibration, etc.

In some embodiments, feedback commands are provided to trigger workflows to implement remediation, optimize performance, improve the functioning of the corresponding materials handling vehicle itself, such as by adjusting controller setpoints to control speed, acceleration, braking, lift height, geo-feature recognition, etc.

Here, the materials handling vehicle may interact with the module server 850 to communicate information back to a materials handling vehicle, by interacting with a workflow 264, e.g., to communicate directly with a remote server, remote controller, remote maintenance scheduler, or remote equipment (e.g., RFID tags, ultra-wideband badges, transponders, mesh processors, positioning system components such as environmental location-based markers deployed in a work environment, etc.) to call in maintenance, to performance tune the equipment, to disable the equipment, to enable the equipment, combinations thereof, etc.

For instance, a root cause of underutilization of a given technology feature such as APS may be low RFID tag health that is impacting the auto-positioning performance. Low RFID health may be difficult or otherwise not detectable absent aspects herein. As such, the utilization of the technology feature may actually stimulate correction of assistive technology in the operating environment of the materials handling vehicle. Moreover, interruptions or trends in technology usage (including trends for groups of operators based on operator shift, operator department, or a facility in which the operators work) can indicate an equipment issue, such as a mechanical defect that might not otherwise be detectable by electronic event/error codes alone.

Another example is an APS move interruption, e.g., where an operator cancels a pick, cancelling APS, deactivating an interlock (such as disengaging a sensor such as a hand or foot sensor), requesting braking during an APS move, etc.).

In view of the above, a process for implementing a materials handling vehicle technology monitor, comprises receiving wirelessly, from a fleet of materials handling vehicles, electronic vehicle records. Each electronic vehicle record comprises technology feature data recorded by a controller on an associated materials handling vehicle in response to a corresponding technology feature on the materials handling vehicle being operated in a work environment by an operator. Each electronic vehicle record also includes an operator identification of the operator of the materials handling vehicle at the time the technology feature data is recorded.

For instance, as illustrated, each materials handling vehicle instance includes an industrial health monitor 842 that communicates electronic vehicle records across the network 804 to the module server 850 of the analysis engine 814. Each electronic vehicle record comprises technology feature data recorded by at least one controller on the associated materials handling vehicle in response to a corresponding technology feature on the materials handling vehicle being operated in a work environment by an operator. For instance, in the example of FIG. 8, an SCM module 820A communicates automation active data to the IHM 842. Also, the TCM 820B communicates speed data to the IHM 842. Moreover, the GCM communicates guidance acquired information to the IHM 842. The IHM 842 condenses this collected information into an electronic vehicle record that characterizes technology feature-related information, e.g., by sending to the module server 850, a distance traveled on wire, a distance on wire while using APS, etc.

In some embodiments, it may be desirable to track technology feature usage by operator. In this instance, each industrial health monitor 842 further communicates to the module server 850, an operator identification of the operator of the materials handling vehicle that is operating the materials handling vehicle at the time the technology feature data is recorded.

The process generates for each operator, an electronic measurement (e.g., via the usage process 852A and the usage trend process 852B in this example) based upon a comparison of an expected technology feature usage (e.g., expressed as a threshold such as the above/below target 854) compared to the technology feature data in the received electronic vehicle records, which are associated with the corresponding operator.

The process also comprises outputting (e.g., via the usage percentage and trend widget 852C, usage widget 858, etc.) to a dashboard, a graphical representation of the generated measurements.

In some embodiments, the system and corresponding process can perform active processes such as analyzing the generated measurements to detect whether there is an equipment issue that is adversely affecting the comparison for at least one operator, and automatically generating an electronic signal that triggers a workflow at 860 to address the detected equipment issue.

In this regard, automatically generating an electronic signal that triggers a workflow at 860 to address the detected equipment issue can be carried out by wirelessly communicating a signal to a materials handling vehicle associated with the detected equipment issue to performance tune the materials handling vehicle, the technology feature specifically, or a combination thereof. A message can also be communicated back as a maintenance item or maintenance checklist, e.g., to require the operator to repair, reconnect, or change a setting. For instance, flow back to the module server 850 can trigger the module server 850 to communicate back across the network 804 to the associated industrial health monitor 842, which can push any updates to the relevant control modules 820.

Automatically generating an electronic signal that triggers a workflow at 860 to address the detected equipment issue can also and/or alternatively be carried out by wirelessly communicating a signal to a materials handling vehicle associated with the detected equipment issue to disable the technology feature. For instance, flow back to the module server 850 can trigger the module server 850 to communicate back across the network 804 to the associated industrial health monitor 842, which can push any updates to the technology feature 840, including a command to disable the technology feature 840, to request diagnostic data, error codes, etc.

Yet further, automatically generating an electronic signal that triggers a workflow at 860 to address the detected equipment issue can also and/or alternatively be carried out by wirelessly communicating a signal to a processor or device in the working environment to performance tune an equipment that interacts with the technology feature on the materials handling vehicles. For instance, a flow to the workflow 860 can cause electronic devices, e.g., tags, UWB badges, electronic beacons, mesh points, communication devices, machines, etc., deployed in the working environment to be updated.

For instance, for a technology feature such as APS, in some embodiments, the travel paths available for an auto-positioning system can be defined by a guidance system. In an example implementation, a material handling vehicle's steering is controlled using sensors mounted on the materials handling vehicle to detect an electronic signal, e.g., transmitted through a wire embedded in the floor by a line driver; transmitted by positioning markers, e.g., RFID tags, ultra-wideband badges, reflectors and/or laser scanning systems, an environmental based location tracking device or other navigation system, position triangulation, dead reckoning, combinations thereof, controlled via rail guidance, etc. Here, the workflow 860 can tune the materials handling vehicle steering sensors, the guidance system device(s), or a combination thereof, e.g., to improve reliability, signal strength, tracking, synchronizing, etc.

Still further, automatically generating an electronic signal that triggers a workflow at 860 to address the detected equipment issue can also and/or alternatively comprise wirelessly communicating a signal to a processor in the working environment to disable an equipment that interacts with the technology feature on the materials handling vehicles. For instance, certain features, such as RFID tag or ultra-wideband badges can be programmed, reprogrammed, disabled, enabled, etc.

Figure 9:
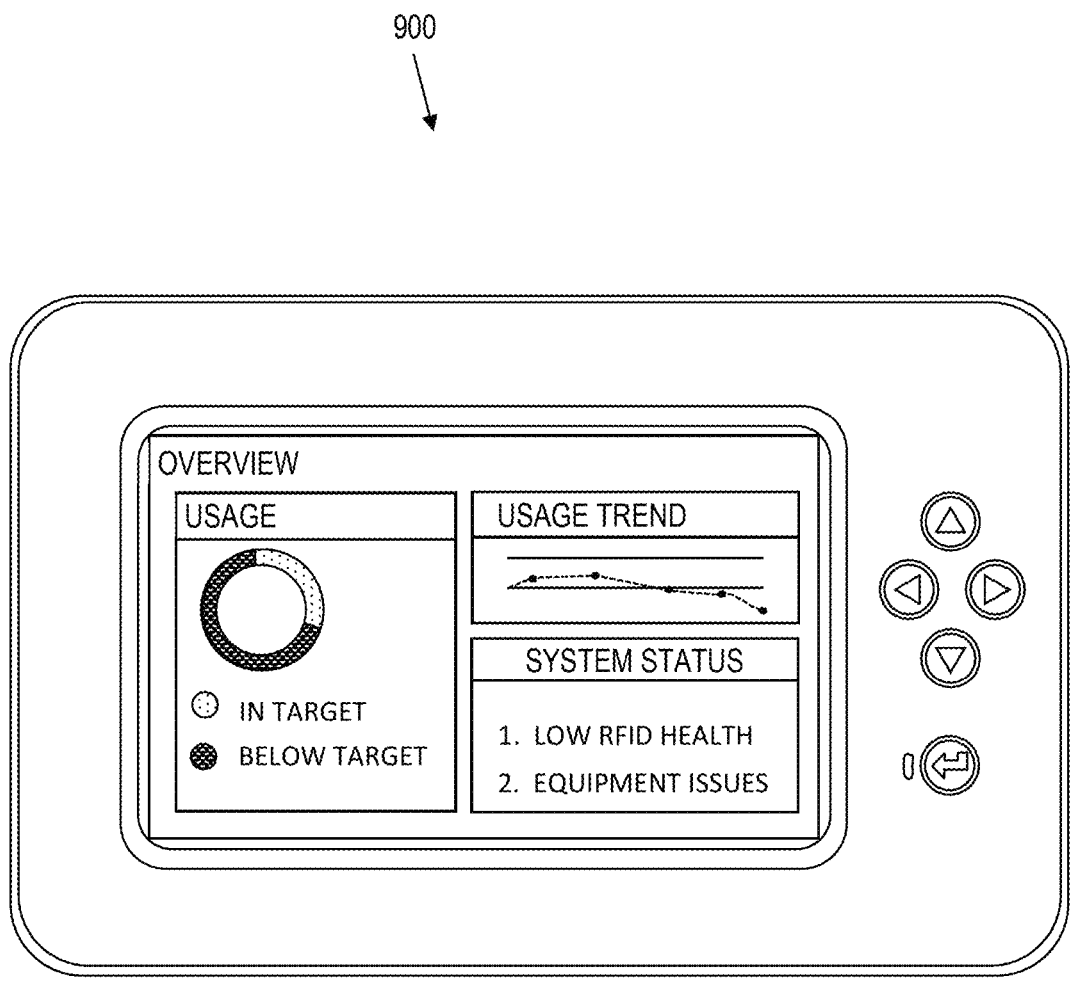
FIG. 9 is a schematic of a vehicle-mounted display that outputs a dashboard of widgets directed to materials handling vehicle and/or operator technology features.

Referring to FIG. 9, an example dashboard output 900 is illustrated. The example dashboard is presented on a display on the materials handling vehicle itself. The example shows an auto-positioning technology feature that has diagnosed low RFID health and equipment issues. Moreover, a usage trend is illustrated. Since the example dashboard output is for a display on a materials handling vehicle, the graphically displayed data is directed to the specific instance of the materials handling vehicle, the operator, or a combination thereof. This information can enable an operator to take action to remediate the situation. In this regard, the system can distinguish operator deficiencies in utilization of the technology feature from electronic deficiencies in the corresponding technology feature.

Figure 10:
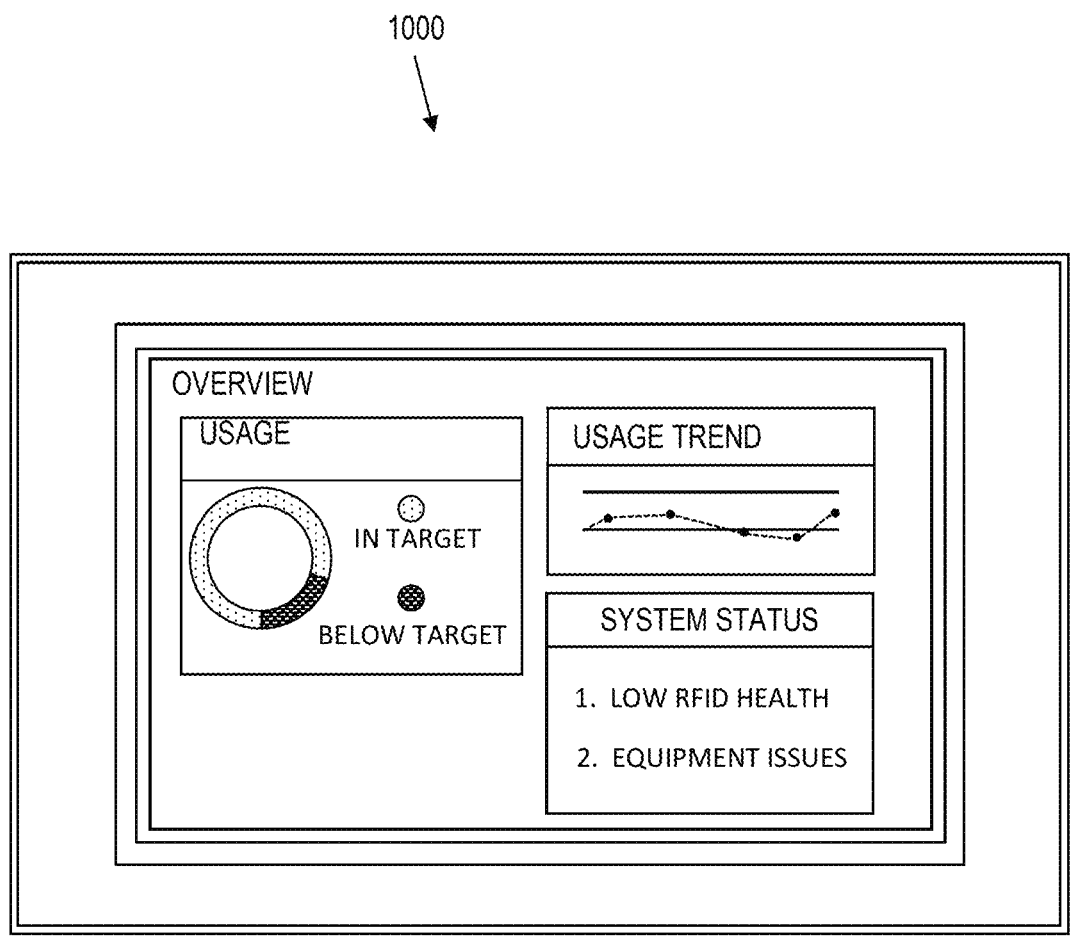
FIG. 10 is a schematic of a tablet display that outputs widgets directed to a specific fleet of materials handling vehicle and/or operators technology features.

Referring to FIG. 10, an example dashboard output 1000 is illustrated on a tablet computer. The view of FIG. 9 differs from the view of FIG. 10 in that the view of FIG. 9 is specific to the operator and/or the particular materials handling vehicle upon which the display is mounted. The view of FIG. 10 is on a tablet computer and represents a data collected across multiple operators operating multiple different materials handling vehicles, e.g., a fleet. Here, trends can be computed for groups of operators based on operator shift, operator department, or a facility in which the operators work, etc.

With reference to FIGS. 9 and 10 collectively, an operator can see their specific statistics, identify issues with the equipment being operated, and take action to correct any detected issues. Analogously, a manager can see an entire fleet or a subset of a fleet, see their specific statistics, identify issues with the equipment being operated, and take action to correct any detected issues. In some embodiments, action to correct detected issues can be automated. For example, in some embodiments, the system learns patterns in technology usage and suggests action to operators whose usage patterns differ from the learned system pattern. In a sense, the system acts as a coach.

Based upon the dashboards, the use and trends of use of technology are monitored, which can be utilized to determine how often/how much an associated technology feature (e.g., auto-positioning) is utilized. This can trigger coaching/training events, to allow correlation to be drawn across technology usage, etc., an ability to study a total wire distance traveled by one or more materials handling vehicles, to evaluate a percentage of that traveled wire distance using the auto-positioning system, and percentage of total travel distance not using auto positioning system (e.g., operating in manual mode). As further examples, views can demonstrate usage trends to determine whether changes are necessary to auto-positioning hardware, etc. In some embodiments, coaching is carried out via onboard/dynamic coaching driven by automated computer technology. In some embodiments however, coaching can be carried out by triggering a notification to an entity such as a supervisor for person-to-person coaching.

As a few illustrative examples, the workflow 864 (FIG. 8) can trigger and fix problems that inhibit the use of the technology feature, e.g., for APS, identify RFID health issues, generate alerts for materials handling vehicles that have not used auto-position in a predetermined period of time, etc.

By way of example, analysis of the output dashboards (widgets) can reveal whether fleet level technology feature usage trends are changing. Moreover, such visibility is across an entire fleet of vehicles, operators, or both. By trending, technical elements such as layout can be correlated to changes in technology feature usage to trigger workflows.

Proficiency Technology Feature Monitoring

Figure 11:
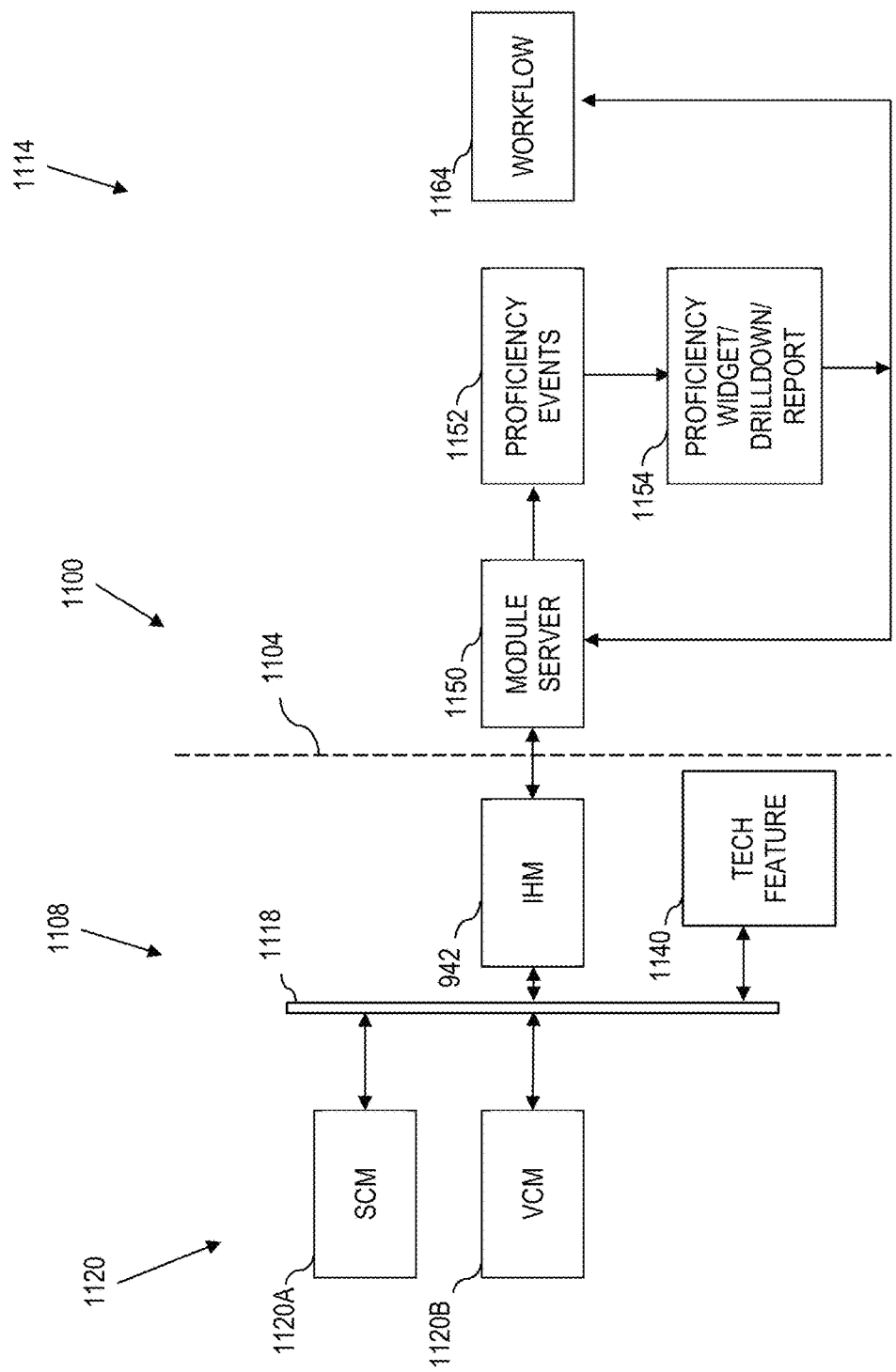
FIG. 11 is a block diagram of a system for proficiency technology feature monitoring and control.

Referring to FIG. 11, a block diagram 1100 illustrates an example of the communication between a materials handling vehicle and a remote server to carry out aspects of technology usage monitoring, and automated vehicle control responsive to technology usage monitoring, according to aspects herein. The block diagram 1100 can be implemented for example, by a materials handling vehicle 108, FIG. 1; 208, FIG. 2, 308, FIG. 3 communicating with a remote server 112, FIG. 1, e.g., via an information linking device 202, FIG. 2, 302, FIG. 3.

The diagram 1100 is largely analogous to the diagram 500, FIG. 5 and/or the diagram 800, FIG. 8. In this regard, like structure is illustrated with like reference numerals 300 higher in FIG. 11 compared to FIG. 8, and 600 higher in FIG. 11 compared to FIG. 5. As such, the disclosure of FIG. 5 and FIG. 8 are incorporated into the details of FIG. 11, and only those changes or differences are described in detail.

As illustrated in FIG. 11, electronics of a materials handling vehicle 1108 include a plurality of control modules that are communicably coupled to a vehicle network 1118. For example, in the illustrated example, the control modules include a sensor control module (SCM) 220A, which outputs data, such as whether a hand is present on a presence sensor, whether a task is handled, whether automation is active, whether a pick is active, etc. The control modules can also include a vehicle control module (VCM) 1120B. The VCM 220B outputs data, such as an indication as to whether a pedal is depressed, whether a gate is closed, etc.

The electronics of the materials handling vehicle 1108 also includes a technology feature 1140, e.g., blending, APS, remote control, rack height select, etc., as described more fully herein.

Moreover, an industrial health monitor 1142 is communicably coupled to the vehicle network 1118. Analogous to that described in FIG. 8, the industrial health monitor 1142 functions as a boundary intermediary, e.g., to control the flow of information between the corresponding materials handling vehicle and a remote server, e.g., a module server 1150. The industrial health monitor 1142 collects technology information from the various control modules 1120 such as proficiency event types, operator identification, vehicle identification, timestamps, etc. Moreover, the industrial health monitor 1142 communicates with a module server 1150 across a communication path, such as a Wi-Fi, as illustrated by network 1104.

The module server 1150 feeds an ETL Pipeline, which comprises a set of processes that extract data from the input received from the industrial health monitor 1142. The processes in the ETL pipeline collectively transform the data, and then load the data into an output destination for reporting, analysis, and data synchronization. For instance, ETL processes can include a proficiency of events process 1152, which outputs to a proficiency widget 1154. In some embodiments, the proficiency widget 1154 also provides drilldown reporting to visualize on the display, the underlying data that contributes to the widget output.

The proficiency widget 1154 generates widget data that can trigger workflows based upon proficiency. For instance, the proficiency widget 1154 can communicate with the module server 1150 (e.g., the module server 1150 can read the values of the widgets and/or drill down detail information) and based upon the data values, send commands back to the materials handling vehicle 1108, e.g., to performance tune the vehicle, performance tune the associated technology feature 1140, to update or repair the technology feature, to lock out the vehicle, or take some other action to improve operation of the technology feature.

In some embodiments, the communication from the module server 1150 back to the materials handling vehicle via the industrial health monitor 1142 can comprise instructions, training, or other operator-driving prompting to improve the operator interaction with the technology feature 1140.

The output of the proficiency widget 1154 can also drive a workflow 1164, such that improvement, repair, or other modification to the technology feature 1140 is brought out via electronic control of an operating environment in which the technology feature 1140 is operated. Feedback and workflow can be utilized for example, to diagnose and fix problems that inhibit the use of the technology feature. For instance, the system may immediately identify and address RFID tag health issues, Location Information Module (LIM) issues (e.g., updating an RFID reader, slot maps, tag maps logic for an auto-positioning system, logic for an auto-fence system etc.), send an alert to vehicles and/or management systems to indicate that the material handling vehicle's technology feature 1140 has not been used in a period of time, etc.

In some embodiments, feedback is directed back to the operator, e.g., via coaching instructions, positive affirmations, corrections, or other suitable messaging. Feedback can be based upon comparisons to benchmark data. Here, because an entire fleet is evaluated, the system knows which operators to coach, and what to coach them on based upon the collected technology usage data.

By way of non-limiting example, by knowing relative relationships between technology feature interruptions (e.g., sensors indicate that an operator's hands are off a necessary control, a foot is off a necessary pedal, a task is cancelled, a gate is being opened, etc., then interruptions can be counted, organized, evaluated and presented back to the operator (e.g., via the truck display-FIG. 9), or back to a manager (e.g., via the tablet-FIG. 10).

System Status

Figure 12:
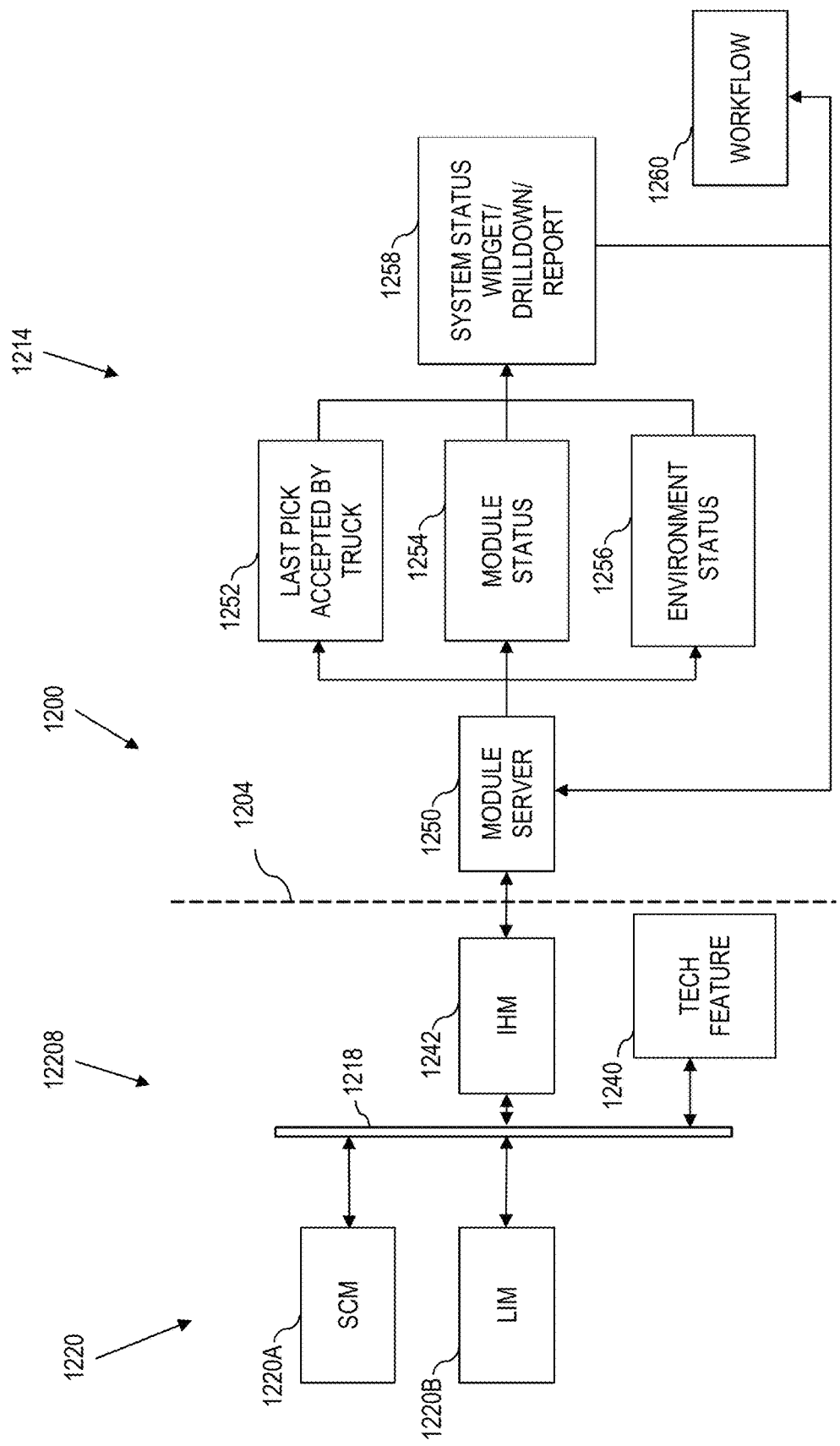
FIG. 12 is a block diagram of a system for technology feature status monitoring and control.

Referring to FIG. 12, a block diagram 1200 illustrates an example of the communication between a materials handling vehicle and a remote server to carry out aspects of technology usage monitoring, and automated vehicle control responsive to technology usage monitoring, according to aspects herein. The block diagram 1200 can be implemented for example, by a materials handling vehicle 108, FIG. 1; 208, FIG. 2, 308, FIG. 3 communicating with a remote server 112, FIG. 1, e.g., via an information linking device 202, FIG. 2, 302, FIG. 3.

The diagram 1200 is largely analogous to the diagram 500, FIG. 5, the diagram 800, FIG. 8, the diagram 1100, FIG. 11 or combinations thereof. In this regard, like structure is illustrated with like reference numerals 100 higher in FIG. 12 compared to FIG. 11; 400 higher in FIG. 12 compared to FIG. 8, and 700 higher in FIG. 12 compared to FIG. 5. As such, the disclosure of FIG. 5, FIG. 8, and FIG. 11 are incorporated into the details of FIG. 12, and only those changes or differences are described in detail.

As illustrated in FIG. 12, electronics of a materials handling vehicle 1208 include a plurality of control modules 1220 that are communicably coupled to a vehicle network 1218. For instance, in the illustrated example, the control modules include a sensor control module (SCM) 1220A, which outputs data, such as whether a pick has been accepted, etc. The control modules 1220 can also include a location information module (LIM) 1220B. The LIM 1220B outputs data, such as whether a module fault has been thrown, a tag health status indication, etc.

Moreover, an industrial health monitor 1242 is communicably coupled to the vehicle network 1218. Analogous to that in other embodiments, the industrial health monitor 1242 functions as a boundary intermediary, e.g., to control the flow of information between the corresponding materials handling vehicle and a remote server, e.g., a module server 1250.

The industrial health monitor 1242 collects technology information from the various control modules 1220 (and optionally, other vehicle electronics as described with reference to FIG. 3) such as proficiency event types, operator identification, vehicle identification, timestamps, etc.

The module server 1250 gathers information from the industrial health monitor 1242, such as information corresponding to whether a pick was accepted and an associated time stamp, a fault status, a tag ID, tag health, etc.

The module server 1250 further feeds an ETL Pipeline, which comprises a set of processes that extract data from the input received from the industrial health monitor 1242. For instance, ETL processes can include a last pick accepted process 1252, which outputs an indication of the last pick accepted by each materials handling vehicle. The ETL can also include a module state 1254, which outputs status information with regard to the technology feature 1240. Yet further, the ETL includes an environmental status process 1256. The environmental status process outputs the status of electronic devices that are deployed within an operating environment to support the corresponding technology feature. For instance, in the context of an auto-positioning system, the environment status process 1256 can collect and output data regarding RFID tags, ultra-wideband badges, etc., which cooperate with the auto-positioning controls on the corresponding materials handling vehicles.

The last pick accepted process 1252, the module status process 1254, and the environment status process 1256 each output to a system status widget 1258. In some embodiments, the system status widget 1258 can also output drill down reporting to visualize on the display, the underlying data that contributes to the widget output, as described more fully herein.

The system status widget 1258 generates widget data that can trigger workflows based upon the system status of a corresponding technology feature 1240. For instance, the system status widget 1258 can communicate with the module server 1250 (e.g., the module server 1250 can read the values of the widgets and/or drill down detail information) and based upon the data values, send commands back to the materials handling vehicle 1208, e.g., to performance tune the vehicle, performance tune the associated technology feature 1240, to update or repair the technology feature, to lock out the vehicle, or take some other action to improve operation of the technology feature.

In some embodiments, the communication from the module server 1250 back to the materials handling vehicle 1208 via the industrial health monitor 1242 can comprise instructions, training, or other operator-driving prompting to improve the operator interaction with the technology feature 1240.

The output of the system status widget 1258 can also drive a workflow 1260, such that improvement, repair, or other modification to the technology feature 1240 is brought out via electronic control of an operating environment in which the technology feature 1240 is operated. Feedback and workflow can be utilized for example, to diagnose and fix problems that inhibit the use of the technology feature in a manner analogous to that described in greater detail herein. For instance, the system may identify and address issues, such RFID tag health, ultra-wideband badge health, LIM issues, generate alerts where a technology feature on an associated materials handling vehicle 1208 has not been used in a predetermined amount of time, etc.

In practical applications, the widget can output drill down information such as an alarm status (e.g., new, old, resolved, etc.) The widget drill down information can also include a date, and type of health issue. By way of non-limiting example, in the case of an auto-positioning system, the health issue can be presented as a location based issue (e.g., location information mode fault), a vehicle electronics fault (e.g., a steer control mode fault), a load handling automation health issue (e.g., a hydraulics automated control mode fault), identify repeated occurrences of similar event codes, etc.

As another example, an output drill down can identify the environment asset type that supports the on-vehicle technology feature (e.g., RFID tag, ultra-wideband badge), and the state of the asset. For instance, the drill down can list an RFID tag, an identifier for that RFID tag, the tag location, and the latest event associated with the asset (e.g., health depleted, battery low, communication poor, etc.). The drill down can also identify technology feature issues, such as by outputting an identifier for the technology feature, the vehicle that the technology feature is installed on, a location of the materials handling vehicle associated with the technology feature, and the latest event code associated with the technology feature (e.g., lost connection to industrial vehicle data (see 118, FIG. 1), lost connection to the warehouse management system (See WMS data 120, FIG. 1), lost connection to the LIM data, (see LMS data 122, FIG. 1), lost connection to location information (see Geo data 124, FIG. 1). The output can also identify a module fault of the technology feature, a module fault of a sensor or controller on the materials handling vehicle responsible for supplying data to the IVM 1240, etc.

Map Status

Figure 13:
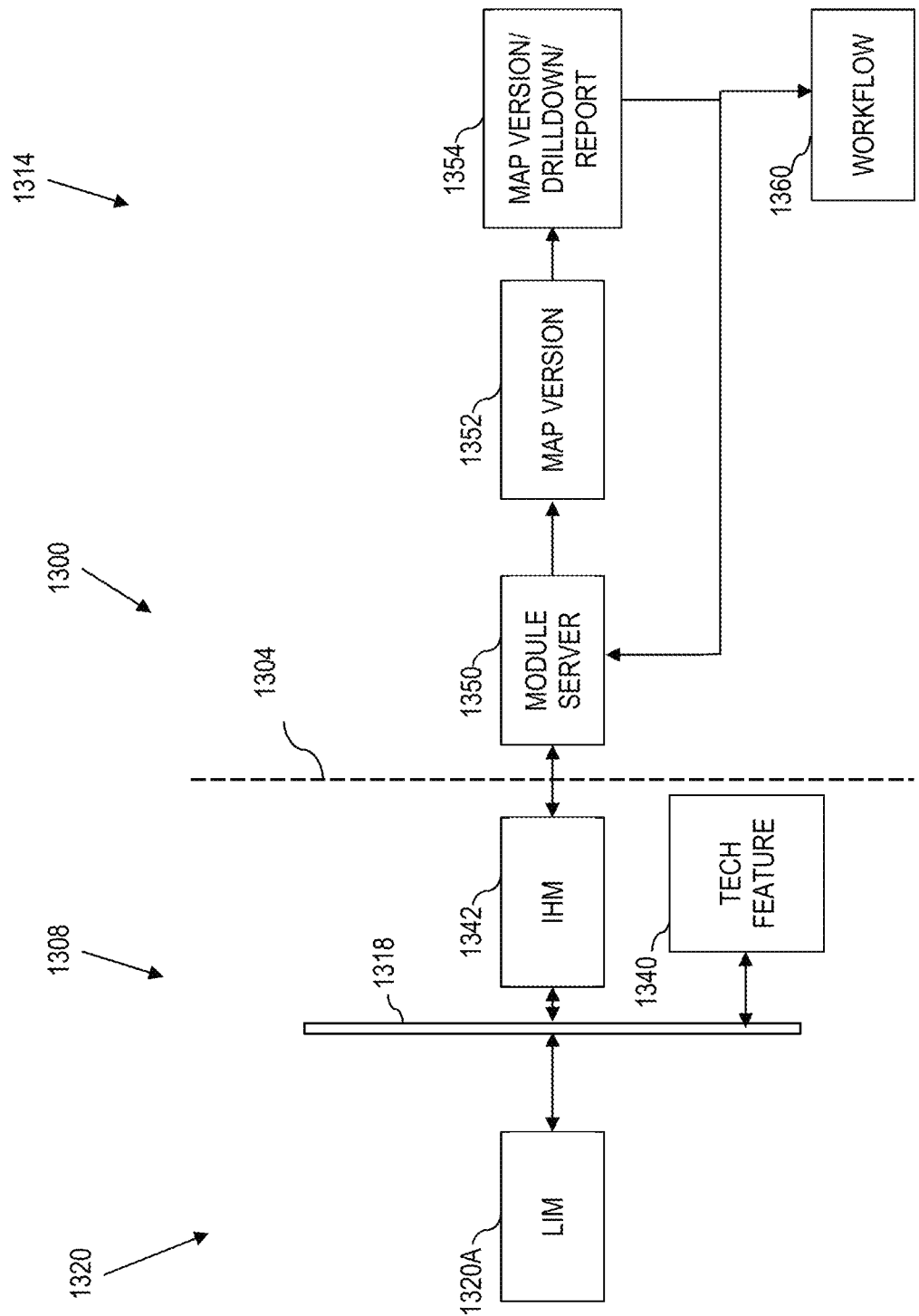
FIG. 13 is a block diagram of a system for technology feature map version monitoring and control.

Referring to FIG. 13, a block diagram 1300 illustrates an example of the communication between a materials handling vehicle and a remote server, according to aspects herein. The block diagram 1300 can be implemented for example, by a materials handling vehicle 108, FIG. 1; 208, FIG. 2, 308, FIG. 3 communicating with a remote server 112, FIG. 1, e.g., via an information linking device 202, FIG. 2, 302, FIG. 3.

The diagram 1300 is largely analogous to the diagram 500, FIG. 5, the diagram 800, FIG. 8, the diagram 1100, FIG. 11, the diagram 1200, FIG. 12, or combinations thereof. In this regard, like structure is illustrated with like reference numerals 100 higher in FIG. 13 compared to FIG. 12; 200 higher in FIG. 13 compared to FIG. 11, 500 higher in FIG. 13 compared to FIG. 8, and 800 higher in FIG. 13 compared to FIG. 5. As such, the disclosure of FIG. 5, FIG. 8, FIG. 11, and FIG. 12 are incorporated into the details of FIG. 13, and only those changes or differences are described in detail.

As illustrated in FIG. 13, electronics of a materials handling vehicle 1308 include a plurality of control modules 1320 that are communicably coupled to a vehicle network 1318. For instance, in the illustrated example, the control modules include a location information module (LIM) 1320A. The LIM 1320A outputs data, such as a slot map version, an RFID tag map version, ultra-wideband badge map version, etc., utilized by the materials handling vehicle 1308.

Moreover, an industrial health monitor 1342 is communicably coupled to the vehicle network 1318. Analogous to that in other embodiments, the industrial health monitor 1342 functions as a boundary intermediary, e.g., to control the flow of information between the corresponding materials handling vehicle and a remote server, e.g., a module server 1350.

The industrial health monitor 1342 collects technology information from the electronics of the industrial vehicle 1308, e.g., collects information from the control module 1320A such as the slot map version, RFID tag map version, ultra-wideband badge version, etc. Moreover, the industrial health monitor 1342 communicates with a module server 1350 across a communication path, such as a Wi-Fi, as illustrated by network 1304.

The module server 1350 gathers information from the industrial health monitor 1342, such as information corresponding to whether a pick was accepted and an associated time stamp, a fault status, a tag ID, tag health, etc.

The module server 1350 further feeds an ETL Pipeline, which comprises a set of processes that extract data from the input received from the industrial health monitor 1342. For instance, ETL processes can include a map version process 1352, which outputs an indication of the slot map version, RFID tag map version, ultra-wideband badge map version, etc.

The map version process 1352, outputs to a map version widget 1354. In some embodiments, the map version widget 1354 can also output drill down reporting to visualize on the display, the underlying data that contributes to the widget output, as described more fully herein.

The map version widget 1354 generates widget data that can trigger workflows based upon the system status of a corresponding technology feature 1340. For instance, the map version widget 1354 can communicate with the module server 1350 (e.g., the module server 1350 can read the values of the widgets and/or drill down detail information) and based upon the data values, send commands back to the materials handling vehicle 1308, e.g., to performance tune the vehicle, performance tune the associated technology feature 1340, to update or repair the technology feature, to lock out the vehicle, or take some other action to improve operation of the technology feature.

In some embodiments, the communication from the module server 1350 back to the materials handling vehicle 708 via the industrial health monitor 1342 can comprise instructions, training, or other operator-driving prompting to improve the operator interaction with the technology feature 1340.

The output of the map version widget 1354 can also drive a workflow 1360, such that improvement, repair, or other modification to the technology feature 1340 is brought out via electronic control of an operating environment in which the technology feature 1340 is operated. Feedback and workflow can be utilized for example, to diagnose and fix problems that inhibit the use of the technology feature. For instance, the system may immediately identify and address issues, such as map issues, environmental positioning of electronic tag issues (e.g., location information of RFID tags, ultra-wideband badges, etc.). The workflow can also ensure that each materials handling vehicle 1308 has a correct and updated map using an automated, electronic distribution mechanism. In this manner, a consolidated dashboard view visualizes data that can confirm that each materials handling vehicle having the associated technology feature 1340 has the correct map loaded into the local memory of the vehicle controller.

Physiological Inputs to Technology Feature Tuning

In some embodiments, systems herein use specific operator data (e.g., which can be collected by a wearable tracker, alertness monitor, health tracker, etc., as tracker data) to fine tune the system, e.g., for close calls between walk or ride determinations, to determine when automation or remote control should be implemented, etc.

By way of example, the system can weigh whether to provide coaching, assistance, automation, remote control, etc., dependent on an operator's health tracker data, and optionally, other data e.g., on what point in the shift the operator is in. For instance, if the system recognizes that operator is slowing down while walking due to fatigue later in an shift (e.g., based upon extracting a pace from generated records collected during the shift), operating parameters of technology features such as remoted-controlled travel can be adjusted. Moreover, the operator's physical state, mental alertness state, combinations thereof, other factors, etc., can be used to "tune" not only when to use or not use the feature (e.g., remote controlled travel function), but also how the function operates, e.g., by tuning acceleration, braking, speed limits, etc. to function best within the capability of the operator.

Thus, aspects herein bring about a technical improvement of intelligent equipment control that adjusts the manner in which technology features operate based upon an operator's physiological state.

Miscellaneous

The various workflows, e.g., workflow 560, FIG. 5, 860, FIG. 8, 1160, FIG. 11, 1260, FIG. 12, 1360, FIG. 13, and other actions, e.g., as initiated by a controller on a materials handling vehicle, can be carried out based upon decisions made using a rules engine. Here, the rules engine can encode actions based upon input conditions, so that outputs are triggered in a consistent manner. For instance, a rules engine on the server, materials handling vehicle (or both) can define parameters that evaluate the technology feature usage to a proper usage, define remediations, define messages including coaching and instruction messages, control the display of information on the widgets, etc.

Aspects of the present disclosure enable managers to access their feature usage data instantly and in a glanceable fashion. Comparing operators to a target in a visual way can help end users to identify operators who require help with technology features easily and timely. Also, in some embodiments, the visual format of the graphical user interface of the dashboard is intended to be accessed from a mobile device, so that it helps facilitate a personal discussion with operators. Automation and integration with a remote server also enables workflows to remediate errors, malfunctions, and issues that are not directly related to operator use/misuse/lack of use.

Aspects of the present disclosure provide a new feature usage target. In some embodiments, the process identifies a feature usage target percentage area based on an evaluation of a facility's unique factors such as average inter-pick distances, aisle lengths, and pick patterns as well as based on historic WMS data (pick lists). This evaluation can also be done automatically and for every pick run, if that data is provided through a gateway between the materials handling vehicle data and the WMS. This allows customization based upon environment.

Aspects herein also provide glanceable information about above/below/on target usage by an operator. Moreover, the dashboard facilitates grouping operators by their usage, identifying operators with additional training needs. Aspects herein also provide a "paired time" metric, that measures how much of a logged period of time, an operator also had a remote control paired with a corresponding materials handling vehicle.

In some embodiments, the system can use vehicle data and intelligence to distinguish where use of a technology feature should be considered. Travel where it is inappropriate to use a technology feature, e.g., remote-controlled travel, is not counted towards total travel in this embodiment. For instance, where the steer wheel data illustrates that a materials handling vehicle is traveling in an arc, an app on the materials handling vehicle can infer that the operator reached an end of an aisle and was entering an adjacent aisle. Here, it is inappropriate to use remote-controlled travel. As such, this distance is not counted as the total travel distance percentage for those dashboards (for instance, FIG. 6, FIG. 7). As another example, if location tracking positions a materials handling vehicle in a non-pick area, then the travel distance in this non-pick area is not counted. Moreover, geofeatures can be used to tag pick aisles. Here, as the materials handling vehicle enters the aisle and encounters the geofeature, the system starts accumulating travel distance as the "total distance", etc.

In other embodiments, the range used to build the dashboards can cause feedback to materials handling vehicles to alter their performance. For instance, the range can tune feedback to a materials handling vehicle, e.g., to set a maximum remote control travel distance, travel speed, limit the number of times the feature is used, etc. Thus, the dynamic tuning can reinforce dynamic coaching.

Materials Handling Vehicle Perspective

As noted in greater detail herein, a controller on a materials handling vehicle runs program code to generate a vehicle record comprised of materials handling vehicle-related data, e.g., travel data, technology feature usage data, sensor data, etc. For instance, the vehicle controller can read odometry data, e.g., by reading data from the traction controller that is communicated across the vehicle network. The vehicle-related travel data can also include pair status (whether the materials handling vehicle is paired with a wireless remote control), the battery level of that control, etc. Activation of the feature can be detected by recognizing a command indicating a button press, by counting occurrences of starting at rest, traveling, and then coming to a rest again under remote control, etc. Also, in some embodiments, an operator must log into the materials handling vehicle before the materials handling vehicle is enabled for normal operation. As such, usage can be tied to the operator rather than the materials handling vehicle itself.

In an example embodiment, a record is created every time the materials handling vehicle moves. The record can include measured data, computed data, a combination thereof, etc. The controller is further programmed to transmit the generated vehicle record to the remote server to log such use.

In some embodiments, e.g., where implementing a remote-controlled travel function, the controller is further programmed to detect that travel of the materials handling vehicle responsive to the remote-controlled travel function was interrupted because an obstacle sensor on the materials handling vehicle detected an obstacle in the travel path of the materials handling vehicle causing the materials handling vehicle to stop. Here, the controller generates a vehicle record comprised of materials handling vehicle travel data associated with the remote-controlled travel function and the detection of the obstacle, and transmits the generated vehicle record to the remote server to log activation of the obstacle sensor on the materials handling vehicle.

In still other embodiments, the controller is further programmed to receive from the remote server, a report, and output the received report to a display mounted on the materials handling vehicle. Here, the report graphically outputs to the display on the materials handling vehicle, a graphical representation of usage of the remote-controlled travel function for a predetermined period. In some embodiments, the graphical representation of usage of the remote controlled travel function comprises a graphical visualization of a total distance that the materials handling vehicle traveled responsive to the remote controlled travel function and a total distance that the materials handling vehicle traveled not using the remote controlled travel function for a predetermined period. Also, in some embodiments, the graphical representation comprises a graph of travel distance out of the total travel of the materials handling vehicle over a predetermined time period. For instance, the graphical representation can be expressed as a percentage of travel responsive to the remote-controlled travel feature compared to total travel distance.

In yet further example embodiments, the controller is further programmed to receive from the remote server, a report, and output the received report to a display mounted on the materials handling vehicle. Here, the report graphically outputs to the display on the materials handling vehicle, a graphical representation of a trend of usage of the remote controlled travel function for a predetermined period, where the trend is overlaid with a target area range extracted from warehouse management system data that defines a range of expected remote controlled travel over total travel.

In still further embodiments, the controller is further programmed to receive from the remote server, a report, and output the received report to a display mounted on the materials handling vehicle. Here, the report graphically outputs to the display on the materials handling vehicle, a graphical representation of time that the operator maintains the remote-control device paired with the remote-control receiver for a predetermined period.

Moreover, in still further embodiments, the controller is further programmed to receive from the remote server, an instruction to modify a performance parameter of the materials handling vehicle responsive vehicle records associated with the operator over a predetermined period of time, and communicate a command to at least one electronic control module by communicating a message across the vehicle network to modify the performance of the materials handling vehicle.

Observations

Aspects herein can apply to any add-on technology or assistance system that a materials handling vehicle is equipped with. Data and metrics about technology usage (e.g., how often an assistance system is used) can be compared to other productivity metrics (e.g., pallets moved per hour from WMS). This comparison could help identify insufficient usage of assistance technology as a root problem for underperforming operators.

Figure 14:
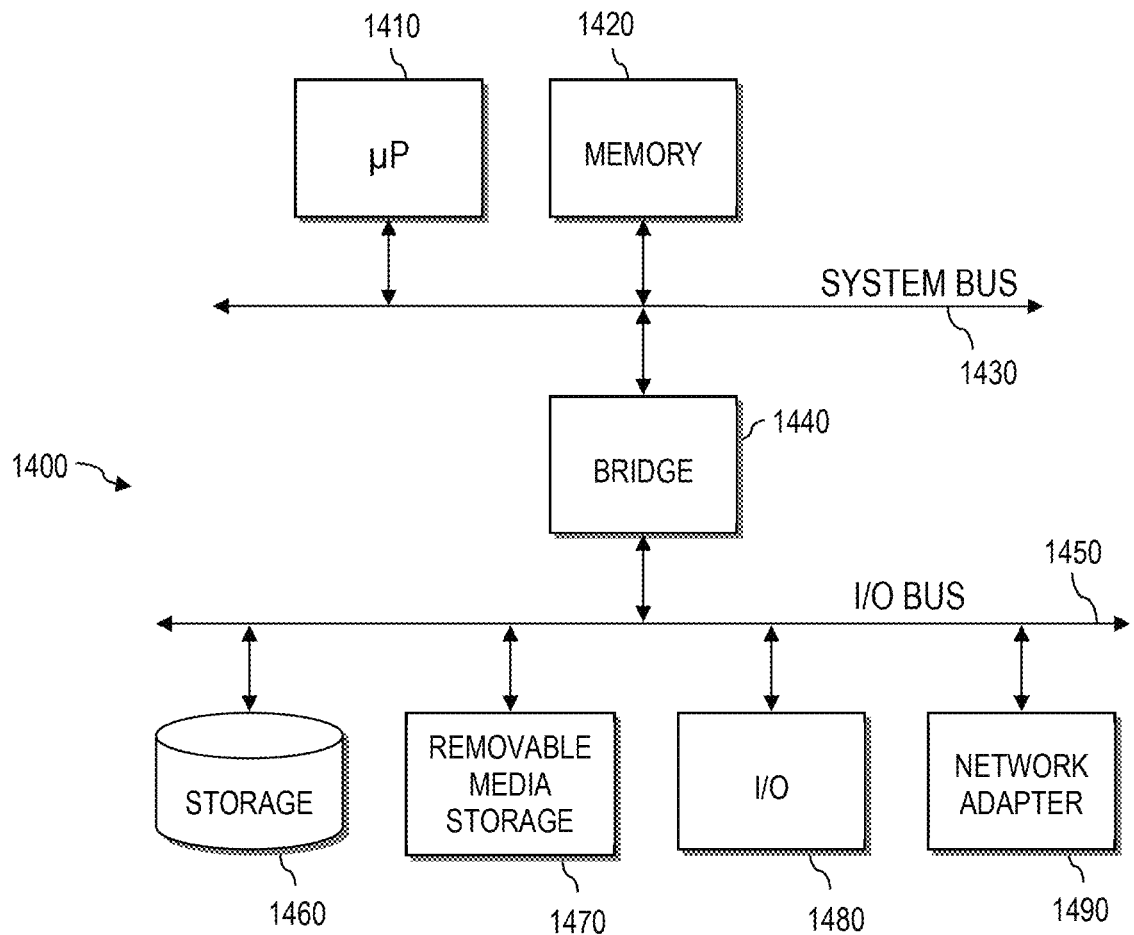
FIG. 14 is a block diagram of a computer system having a computer readable storage medium for implementing functions according to various embodiments as described in greater detail herein.

Referring to FIG. 14, a block diagram of a data processing system is depicted in accordance with the present disclosure. Data processing system 1400 includes one or more processors 1410 connected to memory 1420 across a system bus 1430. A bus bridge 1440 is connected to the system bus 1430 and provides an interface to any number of peripherals, e.g., via an I/O bus 1450. Example peripherals include storage 1460 (e.g., hard drives), removable media storage 1470 (e.g., tape drives, CD-ROM drives, FLASH drives, etc.), I/O 680 (e.g., keyboard, mouse, monitor, etc.), a network adapter 1490 or combinations thereof.

The memory 1420, storage 1450, removable media storage 1460 or combinations thereof can be used to implement a computer usable storage medium having computer usable program code embodied thereon. The computer usable program code is read out and processed to implement any aspect of the present disclosure, for example, to implement any aspect of any of the methods and/or system components illustrated in the preceding FIGURES.

As will be appreciated by one skilled in the art, aspects of the present disclosure may be embodied as a system, method or computer program product. Furthermore, aspects of the present disclosure may take the form of a computer program product embodied in one or more computer readable storage medium(s) having computer readable program code embodied thereon.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

What is claimed is:

1. A process for implementing a monitor for materials handling vehicles having a remote control feature, comprising:
   receiving wirelessly, from a materials handling vehicle being operated in a work environment by a corresponding operator, electronic vehicle records, each electronic vehicle record comprising:
      travel-related data recorded by a controller on the materials handling vehicle; and
      an operator identification of the corresponding operator of the materials handling vehicle;
   parsing the vehicle records over a predetermined time period to extract dashboard data including:
      a first travel distance that the materials handling vehicle traveled over the predetermined time period, responsive to the corresponding operator using a remote-controlled travel function; and
      a total travel distance that the materials handling vehicle traveled over the predetermined time period;
   establishing an expected travel distance under remote control to total travel distance for the predetermined period of time;
   generating an electronic measurement of the expected travel distance under remote control to total travel distance for the predetermined period of time compared to the recorded travel distance under remote control to total travel distance for the predetermined period of time;
   outputting to a dashboard, a graphical representation of the generated measurements;
   analyzing, for the corresponding operator, the electronic measurement of the expected travel distance under remote control to total travel distance for the predetermined period of time compared to the recorded travel distance under remote control to total travel distance for the predetermined period of time;
   selecting a materials handling vehicle control modification based upon the analysis; and
   wirelessly transmitting the materials handling vehicle control modification to the materials handling vehicle, wherein the materials handling vehicle automatically implements the materials handling vehicle control modification to affect operation thereof.

2. The process of claim 1, wherein:
   receiving wirelessly, from the materials handling vehicle, electronic vehicle records, comprises receiving electronic vehicle records indicating whether:

travel occurred while a remote-control device was paired to a remote-control receiver; and the travel occurred as a result of operation of the remote-control device paired to the remote-control receiver of the materials handling vehicle to implement the remote-controlled travel function; and outputting to the dashboard, the graphical representation of the generated measurements further comprises outputting a graphical representation of:

an operator that is paired but does not operate the control feature of the remote-control device;

an operator that uses the control feature too infrequently compared to a target usage;

an operator that uses the control feature too frequently compared to the target usage parameter; or an amount of time that a remote-control device is paired to a remote-control receiver of the corresponding materials handling vehicle.

3. The process of claim 1 further comprising:

outputting an indication of a technical issue with a remote-control device paired to a remote-control receiver of the materials handling vehicle to implement the remote-controlled travel function, the indication of the technical issue comprising a pairing failure; and communicating a command back to a materials handling vehicle that reports a technical issue, to modify the performance of the materials handling vehicle to remedy the technical issue.

4. The process of claim 1 further comprising:

outputting an indication of a technical issue with a remote-control device paired to a remote-control receiver of the materials handling vehicle to implement the remote-controlled travel function, the indication of the technical issue comprising operating the materials handling vehicle without a paired remote; and communicating a command back to a materials handling vehicle that reports a technical issue, to modify the performance of the materials handling vehicle to remedy the technical issue.

5. The process of claim 1 further comprising:

outputting an indication of a technical issue with a remote-control device paired to a remote-control receiver of the materials handling vehicle to implement the remote-controlled travel function, the indication of the technical issue comprising a number of remote-controls reporting a low battery; and communicating a command back to a materials handling vehicle that reports a technical issue, to modify the performance of the materials handling vehicle to remedy the technical issue.

6. The process of claim 1, wherein:

establishing an expected travel distance under remote control to total travel distance comprises establishing the expected travel distance under remote control to total travel distance as a range of ratios of travel distance under remote control to total travel distance; and outputting to the dashboard, the graphical representation of the generated measurements comprises outputting a remote-control usage trend graph that trends a comparison of operator utilization of a control feature on a remote-control device paired to a remote-control receiver of the corresponding materials handling vehicle to implement the remote-controlled travel function, to the range, over time.

7. The process of claim 1 further comprising:

receiving a remote travel command; and denying the remote travel command if the expected travel distance is greater than a first distance.

8. The process of claim 1 further comprising:

receiving a remote travel command; and denying the remote travel command if the expected travel distance is less than a second distance.

9. The process of claim 1 further comprising:

receiving a remote travel command; and allowing the remote travel command if the expected travel distance is less than a first distance and greater than a second distance.

10. The process of claim 1 further comprising:

determining that the electronic measurement of the expected travel distance under remote control to total travel distance for the predetermined period of time compared to the recorded travel distance under remote control to total travel distance for the predetermined period of time indicates an underutilization of the remote-control travel function;

determining a root cause of the underutilization is due to poor transmitter health of a remote control used to transmit the remote-controlled travel function; and indicating that the underutilization is due to poor transmitter health.

11. The process of claim 10, wherein:

determining a root cause of the underutilization is due to poor transmitter health includes determining that the remote control has a weak battery.

12. The process of claim 10, wherein:

determining a root cause of the underutilization is due to poor transmitter health includes determining that the remote control has a broken antenna.

13. The process of claim 10, wherein:

determining a root cause of the underutilization is due to poor transmitter health includes determining that the remote control has poor pairing stability with the vehicle.

* * * * *